(12) United States Patent
Donnelly

(10) Patent No.: US 11,835,952 B2
(45) Date of Patent: *Dec. 5, 2023

(54) SYSTEMS AND METHODS FOR PROVIDING A RIDESHARING VEHICLE SERVICE USING AN AUTONOMOUS VEHICLE

(71) Applicant: UATC, LLC, Mountain View, CA (US)

(72) Inventor: Richard Brian Donnelly, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,510

(22) Filed: Feb. 10, 2022

(65) Prior Publication Data

US 2022/0269270 A1 Aug. 25, 2022

Related U.S. Application Data

(63) Continuation of application No. 16/173,415, filed on Oct. 29, 2018, now Pat. No. 11,281,216.

(Continued)

(51) Int. Cl.
*G05D 1/00* (2006.01)
*G01C 21/34* (2006.01)
(Continued)

(52) U.S. Cl.
CPC ......... *G05D 1/0088* (2013.01); *G01C 21/343* (2013.01); *G01C 21/3438* (2013.01);
(Continued)

(58) Field of Classification Search
CPC ......... G05D 1/0088; G05D 2201/0213; G01C 21/343; G01C 21/3438; G06Q 10/02; G06Q 50/30

See application file for complete search history.

(56) References Cited

U.S. PATENT DOCUMENTS 1,758,826 A 5/1930 Dellert
1,911,224 A 5/1933 Dellert
(Continued)

FOREIGN PATENT DOCUMENTS

CN 203623483 6/2014
CN 105189313 12/2015
(Continued)

OTHER PUBLICATIONS

US 10,802,587 B1, 10/2020, Igata (withdrawn)

*Primary Examiner* — Brian P Sweeney

(74) *Attorney, Agent, or Firm* — Dority & Manning, P.A.

(57) ABSTRACT

Systems and methods for providing an autonomous vehicle service are provided. A method can include obtaining data indicative of a service associated with a user, and obtaining data indicative of a transportation of an autonomous robot. The method can include determining one or more service configurations for the service. The method can include obtaining data indicative of a selected service configuration from among the one or more service configurations, and determining a service assignment for an autonomous vehicle based at least in part on the selected service configuration. The service assignment can indicate that the autonomous vehicle is to transport the user from the service-start location to the service-end location. The method can include communicating data indicative of the service assignment to the autonomous vehicle to perform the service.

19 Claims, 12 Drawing Sheets

Related U.S. Application Data

(60) Provisional application No. 62/747,941, filed on Oct. 19, 2018, provisional application No. 62/716,063, filed on Aug. 8, 2018.

(51) Int. Cl.
  *G06Q 10/02* (2012.01)
  *G06Q 50/30* (2012.01)

(52) U.S. Cl.
  CPC ............ *G06Q 10/02* (2013.01); *G06Q 50/30* (2013.01); *G05D 2201/0213* (2013.01)

(56) References Cited

U.S. PATENT DOCUMENTS

| | | |
|---|---|---|
| 2,132,279 A | 10/1938 | Wicknick et al. |
| 2,563,347 A | 8/1951 | Long |
| 2,642,119 A | 6/1953 | Dary |
| 3,463,539 A | 8/1969 | Racine et al. |
| 3,632,161 A | 1/1972 | Arfaras et al. |
| 3,637,253 A | 1/1972 | Maule et al. |
| 5,653,262 A | 8/1997 | Hanemaayer |
| 5,738,408 A | 4/1998 | Wu |
| 6,030,037 A | 2/2000 | Ritch et al. |
| 6,264,261 B1 | 7/2001 | Krafcik |
| 6,338,518 B1 | 1/2002 | D'Annunzio et al. |
| 6,350,972 B1 | 2/2002 | Wright et al. |
| 6,540,279 B1 | 3/2003 | Bargiel |
| 6,925,679 B2 | 8/2005 | Wallach et al. |
| 7,066,519 B2 | 6/2006 | Rhodes et al. |
| 7,090,274 B1 | 8/2006 | Khan et al. |
| 7,156,442 B2 | 1/2007 | McManus et al. |
| 8,010,230 B2 | 8/2011 | Zini et al. |
| 8,182,016 B2 | 5/2012 | Kaip et al. |
| 8,186,735 B2 | 5/2012 | Maceri et al. |
| 9,256,852 B1 | 2/2016 | Myllymaki |
| 9,510,682 B2 | 12/2016 | Hasegawa et al. |
| 9,533,625 B2 | 1/2017 | Krishnan et al. |
| 11,164,241 B2 | 11/2021 | Greenberger |
| 2005/0028543 A1 | 2/2005 | Whitehead et al. |
| 2007/0156540 A1 | 7/2007 | Koren et al. |
| 2008/0185893 A1 | 8/2008 | Behrens et al. |
| 2010/0052374 A1 | 3/2010 | Bell et al. |
| 2015/0006005 A1 | 1/2015 | Yu et al. |
| 2015/0379468 A1 | 12/2015 | Danaher |
| 2016/0280095 A1 | 9/2016 | Frye et al. |
| 2017/0354996 A1 | 2/2017 | Lim et al. |
| 2017/0166173 A1 | 6/2017 | Lauffer et al. |
| 2018/0079278 A1 | 3/2018 | Kirpichnikov et al. |
| 2018/0189717 A1* | 7/2018 | Cao ................ G06Q 50/30 |

FOREIGN PATENT DOCUMENTS

| | | |
|---|---|---|
| DE | 4200476 | 7/1993 |
| DE | 19822694 | 11/1999 |
| DE | 102010055365 | 7/2011 |
| EP | 1247473 | 10/2002 |
| EP | 2258579 | 8/2010 |
| FR | 2920011 | 2/2009 |
| JP | 6270307 | 12/2013 |
| JP | 6262937 | 1/2014 |
| KR | 100783510 | 6/2007 |
| WO | WO2012060462 | 5/2012 |
| WO | WO2017156586 | 9/2017 |

* cited by examiner

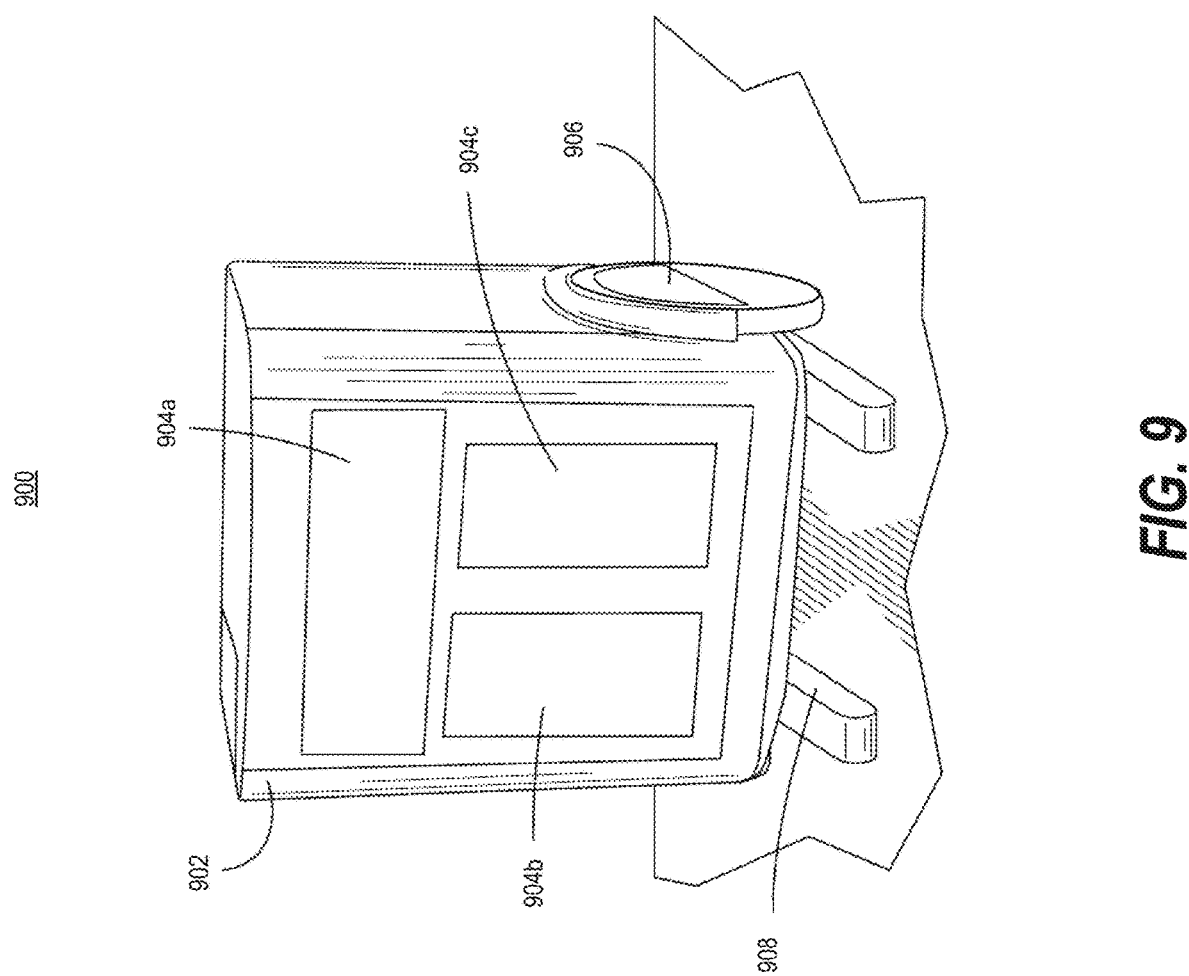

SYSTEMS AND METHODS FOR PROVIDING A RIDESHARING VEHICLE SERVICE USING AN AUTONOMOUS VEHICLE

PRIORITY CLAIM

The present application claims the benefit of priority of U.S. Non-Provisional patent application Ser. No. 16/173,415, filed Oct. 29, 2018, which claims the benefit of priority of U.S. Provisional Patent Application No. 62/716,063, filed on Aug. 8, 2018, entitled "Vehicle Hardware, Systems, and Methods," and U.S. Provisional Patent Application No. 62/747,941, filed on Oct. 19, 2018, entitled "Systems and Methods for Providing a Ridesharing Vehicle Service Using an Autonomous Vehicle." The above-referenced patent applications are incorporated herein by reference in their entirety.

FIELD

The present disclosure relates generally to devices, systems, and methods for providing a vehicle service with an option to share a vehicle with autonomous robots.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of the present disclosure will be set forth in part in the following description, or may be learned from the description, or may be learned through practice of the embodiments.

An example aspect of the present disclosure is directed to a computer-implemented method for providing an autonomous vehicle service. The method can include obtaining, by a computing system that includes one or more computing devices, data indicative of a user service request. The user service request can include a service-start location and a service-end location for a service associated with a user. The method can include obtaining, by the computing system, data indicative of a vendor ride request for the transportation of an autonomous robot. The method can include determining, by the computing system, one or more service configurations for the service based at least in part on the data indicative of the user service request and the data indicative of the vendor ride request. Each service configuration can include a travel time, an available cabin space, and a service cost associated with the service. The method can include obtaining, by the computing system, data indicative of a selected service configuration from among the one or more service configurations. The method can include determining, by the computing system, a service assignment for an autonomous vehicle based at least in part on the selected service configuration. The service assignment can indicate that the autonomous vehicle is to transport the user from the service-start location to the service-end location. The method can include communicating, by the computing system, data indicative of the service assignment to the autonomous vehicle to perform the service.

Another example aspect of the present disclosure is directed to a computing system including one or more processors and a memory including one or more computer-readable media. The memory can store computer-readable instructions that when executed by the one or more processors can cause the one or more processors to perform operations. The operations can include obtaining data indicative of a user service request. The user service request can include a service-start location and a service-end location for a service associated with a user. The operations can include obtaining data indicative of a vendor ride request for the transportation of an autonomous robot. The operations can include determining one or more service configurations for the service based at least in part on the data indicative of the user service request and the data indicative of the vendor ride request. Each service configuration can include a travel time, an available cabin space, and a service cost associated with the service. The operations can include obtaining data indicative of a selected service configuration from among the one or more service configurations. The operations can include determining a service assignment for an autonomous vehicle based at least in part on the selected service configuration. The service assignment can indicate that the autonomous vehicle is to transport the user from the service-start location to the service-end location. The service assignment can also indicate that the autonomous vehicle is to pick-up the user and pick-up the autonomous robot. The operations can include communicating data indicative of the service assignment to the autonomous vehicle to undertake the service.

Yet another example aspect of the present disclosure is directed to one or more tangible non-transitory computer-readable media storing computer-readable instructions that when executed by one or more processors cause the one or more processors to perform operations. The operations can include obtaining data indicative of a user service request. The user service request can include a service-start location and a service-end location for a service associated with a user. The operations can include obtaining data indicative of a vendor ride request for the transportation of an autonomous robot. The operations can include determining one or more service configurations for the service based at least in part on the data indicative of the user service request and the data indicative of the vendor ride request. Each service configuration can include a travel time, an available cabin space, and a service cost associated with the service. The operations can include obtaining data indicative of a selected service configuration from among the one or more service configurations. The operations can include determining a service assignment for an autonomous vehicle based at least in part on the selected service configuration. The service assignment can indicate that the autonomous vehicle is to transport the user from the service-start location to the service-end location. The service assignment can also indicate that the autonomous vehicle is to pick-up the user and pick-up the autonomous robot. The operations can include communicating data indicative of the service assignment to the autonomous vehicle to undertake the service.

Other example aspects of the present disclosure are directed to systems, methods, vehicles, apparatuses, tangible, non-transitory computer-readable media, and memory devices for providing a vehicle service with an option to share a vehicle with autonomous robots.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIG. 9 depicts an example autonomous robot according to example embodiments of the present disclosure.

Figure 1:
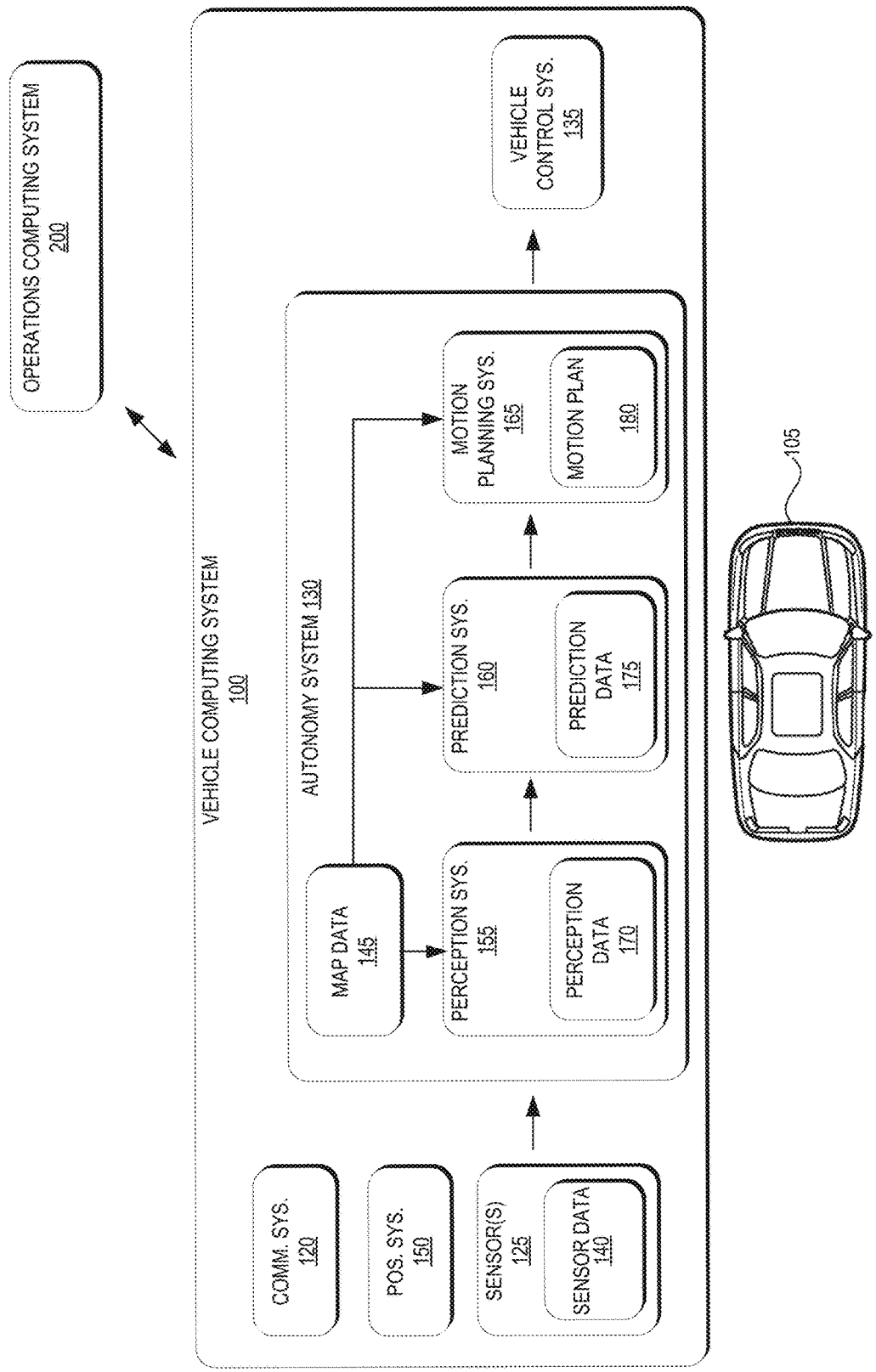
FIG. 1 depicts an example vehicle computing system, according to example embodiments of the present disclosure.

Reference numerals that are repeated across plural figures are intended to identify the same components or features in various implementations.

DETAILED DESCRIPTION

Example aspects of the present disclosure are directed to managing a fleet of vehicles to more efficiently provide a vehicle service (e.g., transportation service, delivery service, courier service, etc.). A service entity (e.g., operations computing system) can operate the fleet of vehicles to provide the vehicle service for another entity requesting the vehicle service (e.g., a user, vendor, etc.). The fleet can include, for example, autonomous vehicles that can drive, navigate, operate, etc. with minimal and/or no interaction from a human driver. The service entity can monitor, coordinate, manage, etc. the autonomous vehicles via an operations computing system (e.g., a cloud-based remote computing system, etc.). For example, when a user requests a vehicle service from the service entity, the operations computing system can provide the user with an estimated arrival time and cost for the service. If the user agrees to the estimated arrival time and cost, then the operations computing system can cause a vehicle from the fleet of vehicles to provide the service. Systems and methods of the present disclosure can enable the operations computing system to provide the user with an option to share the vehicle (e.g., rideshare) with one or more autonomous robots, which can impact the estimated arrival time, cost, and cabin space available to the user for the service. The operations computing system can determine a plurality of candidate routes (e.g., to pick-up and drop-off the autonomous robots) that correspond to one or more service configurations for ridesharing the vehicle with the one or more different autonomous robots. The operations computing system can select a candidate route from the plurality of candidate routes (e.g., service route) based at least in part on input from the user, and control a vehicle from the fleet of vehicles to provide the service based on the selected service route. In this way, the autonomous vehicle can more efficiently travel to concurrently provide multiple services (e.g., transporting an autonomous robot, transporting a user, etc.), which can lead to a more effective use of the onboard computing (e.g., processing, memory, etc.) and power resources of the autonomous vehicle.

More particularly, a service entity can operate a fleet of one or more vehicles (e.g., ground-based vehicles) to provide a vehicle service such as a transportation service, a courier service, a delivery service, etc. The vehicles can be autonomous vehicles that include various systems and devices configured to control the operation of the vehicle. For example, an autonomous vehicle can include an onboard vehicle computing system for operating the vehicle (e.g., located on or within the autonomous vehicle). In some implementations, the autonomous vehicles can operate in an autonomous mode. For example, the vehicle computing system can receive sensor data from sensors onboard the vehicle (e.g., cameras, LIDAR, RADAR), attempt to comprehend the environment proximate to the vehicle by performing various processing techniques on the sensor data, and generate an appropriate motion plan through the environment. In some implementations, the autonomous vehicles can operate in a manual mode. For example, a human operator (e.g., driver) can manually control the autonomous vehicle. Moreover, the autonomous vehicle can be configured to communicate with one or more computing device(s) that are remote from the vehicle. For example, the autonomous vehicle can communicate with an operations computing system that can be associated with the service entity. The operations computing system can help the service entity monitor, communicate with, manage, etc. the fleet of vehicles. As another example, the autonomous vehicle can communicate with one or more other vehicles (e.g., a vehicle computing system onboard each of the one or more other vehicles in the fleet), or other remote computing systems. In some implementations, the operations computing system can mediate communication between the autonomous vehicle and other computing device(s) that are remote from the vehicle.

A user (e.g., a human individual) can provide (e.g., via a user device) a request for a vehicle service to an operations computing system associated with the service entity. The request can indicate the type of vehicle service that the user desires (e.g., a transportation service, a delivery service, a courier service, etc.), a number of user(s) to be transported, a number and/or other characteristics (e.g., size, shape, type, etc.) of item(s) to be transported, one or more locations (e.g., an origin location, a destination location, etc.), timing constraints (e.g., pick-up time, drop-off time, deadlines, etc.), service parameters (e.g., a need for handicap access, a need for trunk space, etc.), and/or other information. The operations computing system of the service entity can process the request and generate a service assignment indicative of the requested vehicle services, as further described herein.

According to aspects of the present disclosure, the operations computing system can be configured to generate service assignments that include the concurrent transportation of user(s) and autonomous robot(s). For instance, the operations computing system can obtain a user service request for a vehicle service from a user device (e.g., a mobile phone, etc.) associated with a user. The user service request can include, for example, a service-start location and a service-end location. The service-start location can indicate a location to begin providing the vehicle service, and the service-end location can indicate a location to complete providing the vehicle service. In some implementations, the user service request can include a minimum amount of cabin space desired by the user. For example, if a user is traveling with luggage or other items that the user would like to keep inside the vehicle's cabin, then the user can indicate (e.g., via user input associated with a user interface of an application on the user device) a minimum amount of cabin space in the user service request for the luggage or other items.

According to aspects of the present disclosure, the operations computing system can receive one or more requests for a vehicle service from one or more vendors (e.g., vendor ride requests). Each of the vendor ride requests can be associated with an autonomous robot (e.g., the transportation thereof) and can include a ride-start location and a ride-end location. The ride-start location can indicate a location to pick-up the autonomous robot, and the ride-end location can indicate a location to drop-off the autonomous robot. The ride-start location and/or the ride-end location can be location(s) identified by the vendor such as, for example, a store associated with the vendor at which to pick-up the autonomous robot and a delivery address at which to drop-off the autonomous robot. Additionally, or alternatively, the ride-start location and/or the ride-end location can be pre-determined location(s). For example, the ride-start location can be a location that has been designated for autonomous robot pick-up (e.g., designated by the service entity) within a certain geographic area and/or the ride-end location can be a location that has been designated for autonomous robot drop-off within a certain geographic area.

In some implementations, a vendor ride request can include an amount of cabin space in a vehicle that will be used by the autonomous robot. As an example, a first autonomous robot can be associated with one unit of cabin space (e.g., equivalent to an amount of space occupied by one seat) and a second autonomous robot can be associated with two units of cabin space. A vendor ride request for the first autonomous robot can include one unit of cabin space in association with the first autonomous vehicle, and a vendor ride request for the second autonomous robot can include two units of cabin space in association with the second autonomous robot. The operations computing system can determine a user service request that can accommodate the first autonomous robot and/or second autonomous robot based at least in part on the associated amount of cabin space for the first and/or second autonomous robot and a minimum amount of cabin space associated with the user service request.

According to aspects of the present disclosure, the operations computing system can determine a plurality of candidate routes for the user service request. Each of the plurality of candidate routes can correspond to sharing a vehicle that is being controlled to provide the vehicle service with one or more different autonomous robots. For instance, the operations computing system can determine a main candidate route from the service-start location to the service-end location that does not include any deviations for ridesharing. The operations computing system can determine a travel time and a service cost for servicing the user's service request based on the main candidate route. The operations computing system can determine a plurality of candidate stops proximate to the main candidate route, based at least in part on the one or more vendor ride requests. The plurality of candidate stops can include, for example, a ride-start location (e.g., to pick-up the autonomous robot) for each vendor ride request, and a ride-end location (e.g., to drop-off the autonomous robot) for each vendor ride request. As an example, if a first vendor ride request includes a first location (e.g., at a store) as a ride-start location and a second location (e.g., an address of a delivery location) as a ride-end location, then the plurality of candidate stops can include the first location and the second location.

In some implementations, the operations computing system can filter the plurality of candidate stops based on, for example, a detour distance, detour time, or cargo space. As an example, the operations computing system can determine a distance of each candidate stop from the main candidate route (e.g., detour distance), and filter the plurality of candidate stops to include candidate stops that are associated with a detour distance that is less than a threshold detour distance (e.g., less than 0.5, 1, 2 miles, etc.). As another example, the operations computing system can determine a time to travel to each candidate stop from the main candidate route, and filter the plurality of candidate stops to include candidate stops that are associated with a detour time that is less than a threshold detour time (e.g., less than 1, 2, 5, 10 minutes, etc.). As another example, the operations computing system can determine an available cabin space (e.g., by subtracting the minimum cabin space in the user service request from a total cabin space in the vehicle), and filter the plurality of candidate stops to include candidate stops that are associated with an amount of cabin space that is less than or equal to the available cabin space.

In some implementations, the operations computing system can determine a plurality of detour candidate routes based at least in part on the plurality of candidate stops. Each detour candidate route can intersect at least one candidate stop from the plurality of candidate stops. As an example, if a user service request includes a request for a vehicle service from a first location to a second location, and a vendor ride request includes a request for a vehicle service for the transportation of an autonomous robot from a third location to the second location, then the operations computing system can determine a detour candidate route from the first location (e.g., to pick-up the user), through the third location (e.g., to pick-up the autonomous robot), to the second location (e.g., to drop-off the user and the autonomous robot). Alternatively, the operations computing system can determine a detour candidate route from the third location (e.g., to pick-up the autonomous robot), through the first location (e.g., to pick-up the user), to the second location (e.g., to drop-off the user and the autonomous robot). As another example, if a user service request includes a request for a vehicle service from a first location to a second location, and a vendor ride request includes a request to transport an autonomous robot from a third location to a fourth location, then the operations computing system can determine a detour candidate route from the first location (e.g., to pick-up the user), through the third location (e.g., to pick-up the autonomous robot) and the fourth location (e.g., to drop-off the autonomous robot), to the second location (e.g., to drop-off the user). Alternatively, the operations computing system can determine a detour candidate route from the first location, through the third location, to the second location (e.g., such that the autonomous robot's ride only partially overlaps with the user's service); from the third location (e.g., to pick-up the autonomous robot), through the first location (e.g., to pick-up the user) and the fourth location (e.g., to drop-off the autonomous robot), to the second location (e.g., to drop-off the user); or from the third location (e.g., to pick-up the autonomous robot), through the first location (e.g., to pick-up the user), to the second location (e.g., to drop-off the user).

According to aspects of the present disclosure, the operations computing system can select a candidate route from the plurality of candidate routes to use for the service (e.g., service route). For example, the operation computing system can provide data indicative of the plurality of candidate routes to the user, and obtain data indicative of a user selection from the user indicative of a preferred candidate route from the plurality of candidate routes. The operations computing system can select a candidate route from the plurality of candidate routes as the service route, based at least in part on the input from the user.

In some implementations, the operations computing system can determine a travel time, available cabin space, and/or service cost associated with each of the plurality of candidate routes. As an example, for each autonomous robot that rideshares with a user during a service, the operations computing system can determine an increase in travel time for the user and/or a decrease in service cost for the user. As another example, for each autonomous robot that rideshares with a user during a service, the operations computing system can decrease the service cost for the user by a certain amount. As another example, for each unit of cabin space that is occupied by an autonomous robot that rideshares with the user during a service, the operations computing system can decrease the service cost for the user by a certain amount. In some implementations, the operations computing system can provide data indicative of the determined travel time, available cabin space, and/or service cost associated with each of the plurality of candidate routes to a user device associated with the user.

In some implementations, the operations computing system can determine one or more service configurations, based at least in part on the travel time, available cabin space, and/or service cost associated with each of the plurality of candidate routes. As an example, the operations computing system can determine a first service configuration for lowest cost. The first service configuration can include one or more candidate routes that are associated with a lowest service cost. As another example, the operations computing system can determine a second service configuration for shortest time. The second service configuration can include one or more candidate routes that are associated with a shortest travel time. In some implementations, the operations computing system can determine a plurality of service configurations for a plurality of different travel times, available cabin space, and/or service costs. In some implementations, the operations computing system can provide data indicative of the one or more service configurations to a user device associated the user.

In some implementations, the operations computing system can obtain data indicative of the input from the user based at least in part on the travel time, available space, and/or service cost associated with each of the plurality of candidate routes. For example, the user device of the user can present a user interface (e.g., via a display device) that is indicative of the travel time, available space, and/or service cost associated with each of the plurality of candidate routes. The user can provide user input (e.g., a touch input, cursor input, text input, etc.) associated with the user interface to the user device to indicate various preferences. The input from the user can indicate, for example, a preferred travel time, preferred cabin space, and/or preferred service cost. Additionally, or alternatively, the input from the user can include a range of preferred travel times, a range of preferred cabin space, and/or a range of preferred tip cost. The user device can communicate data indicative of the user's preferences to the operations computing system. The operations computing system can select a service route from the one or more candidate routes, based at least in part on the input from the user.

In some implementations, the operations computing system can obtain data indicative of user input associated with one or more service configurations. For example, the operations computing system can provide data indicative of the one or more service configurations to the user device associated with the user. The user device can display the one or more service configurations to the user (e.g., via a user interface of a display device) and allow the user to provide input indicative of a preferred service configuration or a range of preferred service configurations. As an example, the user device can display a plurality of service costs that are each associated with one or more service configurations. A service configuration associated with a lower service cost can include a longer travel time and/or less available cabin space; whereas a service configuration associated with a higher service cost can include a shorter travel time and/or more available cabin space. The user can provide input indicative of a preferred service configuration based at least in part on the service cost associated with the preferred service configuration. As another example, the user device can display a plurality of travel times that are each associated with one or more service configurations. A service configuration associated with a shorter travel time can include a higher service cost, whereas a service configuration associated with a longer travel time can include a lower service cost. The user can provide input indicative of a preferred service configuration based at least in part in the travel time associated with the preferred service configuration. The operations computing system can select a service route from one or more candidate routes associated with the preferred service configuration. As an example, the user can provide input indicative of the service route and the operations computing system can select the service route based at least in part on the input from the user. As another example, the operations computing system can select a service route that is associated with a shortest travel time from the one or more candidate routes associated with the preferred service configuration. Alternatively, the operations computing system can use one or more different criteria (e.g., travel time, available cabin space, service cost, etc.) to select the service route from the one or more candidate routes associated with the preferred service configuration.

According to aspects of the present disclosure, the operations computing system can control an autonomous vehicle from the fleet of vehicles to service the user service request. In some implementations, the operations computing system can determine the service route for the user service request, as discussed above, and select an autonomous vehicle from the fleet of vehicles based at least in part on the determined service route. For example, if the service route is from a first location to a second location, then the operations computing system can select a first autonomous vehicle that is proximate to the first location to service the user service request. The operations computing system can cause the first autonomous vehicle to initiate a motion control to transport the user, and one or more autonomous robots, along the service route to service the user service request. For example, the operations computing system can communicate data indicative of the service route to the autonomous vehicle, which can initiate an operation to control the motion of the autonomous vehicle to begin travelling in accordance with the service route.

The systems and methods described herein may provide a number of technical effects and benefits. For instance, a computing system (e.g., operations computing system) can facilitate and optimize the sharing of a vehicle between users and goods (e.g., autonomous robots). The operations computing system can determine a travel time, available cabin space, and service cost for ridesharing with one or more different autonomous robots, and reconfigure the tradeoffs between the travel time, available cabin space, and service cost to allow a user to easily select a preferred ridesharing configuration. In this way, the present disclosure can enable the operations computing system to operate a fleet of vehicles with reduced traffic, lowered service costs for a user, lower ride costs for a vendor, higher vehicle utilization and better energy efficiency.

The systems and methods of the present disclosure also provide an improvement to autonomous computing technology, such as vehicle computing technology. For instance, the vehicle computing system onboard an autonomous vehicle can obtain a service assignment for the vehicle to service a user service request, based at least in part on a plurality of ridesharing service configurations. The vehicle computing system can control the autonomous vehicle to provide the vehicle service based at least in part on the service assignment to provide the vehicle service that includes ridesharing with one or more autonomous robots. In this way, the vehicle computing system can operate the autonomous vehicle to provide concurrent services for autonomous robot(s) and human users. This can increase the ability and flexibility of an autonomous vehicle to address more (and a variety) of service requests. By addressing more service requests, the autonomous vehicle can experience a higher utilization rate, which can help reduce non-essential data usage that arises when the autonomous vehicle is idle (e.g., as it gathers and processes sensor data). Ultimately, this can allow the vehicle computing system to better allocate its onboard resources for use during the provision of vehicle services as opposed to while the vehicle is in an idle state.

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

The vehicle 105 incorporating the vehicle computing system 100 can be various types of vehicles. The vehicle 105 can be autonomous vehicle. For instance, the vehicle 105 can be a ground-based autonomous vehicle such as an autonomous car, autonomous truck, autonomous bus, etc. The vehicle 105 can be an air-based autonomous vehicle (e.g., airplane, helicopter, or other aircraft) or other types of vehicles (e.g., watercraft, etc.). The vehicle 105 can drive, navigate, operate, etc. with minimal and/or no interaction from a human operator (e.g., driver). An operator (also referred to as a vehicle operator) can be included in the vehicle 105 and/or remote from the vehicle 105. In some implementations, the vehicle 105 can be a non-autonomous vehicle.

In some implementations, the vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a vehicle operator present in the vehicle 105 and/or remote from the vehicle 105). The vehicle 105 can operate in a semi-autonomous operating mode in which the vehicle 105 can operate with some input from a vehicle operator present in the vehicle 105 (and/or a human operator that is remote from the vehicle 105). The vehicle 105 can enter into a manual operating mode in which the vehicle 105 is fully controllable by a vehicle operator (e.g., human driver, pilot, etc.) and can be prohibited and/or disabled (e.g., temporary, permanently, etc.) from performing autonomous navigation (e.g., autonomous driving). In some implementations, the vehicle 105 can implement vehicle operating assistance technology (e.g., collision mitigation system, power assist steering, etc.) while in the manual operating mode to help assist the vehicle operator of the vehicle 105.

The vehicle computing system 100 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein.

The vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the vehicle 105 over one or more networks (e.g., via one or more wireless signal connections). In some implementations, the communications system 120 can allow communication among one or more of the system(s) on-board the vehicle 105. The communications system 120 can include any suitable components for interfacing with one or more network(s), including, for example, transmitters, receivers, ports, controllers, antennas, and/or other suitable components that can help facilitate communication.

In some implementations, the vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the vehicle 105. For instance, the vehicle sensor(s) 125 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The vehicle 105 can also include other sensors configured to acquire data associated with the vehicle 105. For example, the vehicle 105 can include inertial measurement unit(s), wheel odometry devices, and/or other sensors.

In some implementations, the sensor data 140 can be indicative of one or more objects within the surrounding environment of the vehicle 105. The object(s) can include, for example, vehicles, pedestrians, bicycles, and/or other objects. The object(s) can be located in front of, to the rear of, to the side of the vehicle 105, etc. The sensor data 140 can be indicative of locations associated with the object(s) within the surrounding environment of the vehicle 105 at one or more times. The vehicle sensor(s) 125 can provide the sensor data 140 to the autonomy computing system 130.

In some implementations, in addition to the sensor data 140, the autonomy computing system 130 can retrieve or otherwise obtain map data 145. The map data 145 can provide information about the surrounding environment of the vehicle 105. In some implementations, an vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 105 in comprehending and perceiving its surrounding environment and its relationship thereto. In some implementations, the vehicle computing system 100 can determine a vehicle route for the vehicle 105 based at least in part on the map data 145.

In some implementations, the vehicle 105 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 100 and/or provided to a remote computing system. For example, the map data 145 can provide the vehicle 105 relative positions of the elements of a surrounding environment of the vehicle 105. The vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

In some implementations, the autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the vehicle 105 according to the motion plan.

The vehicle computing system 100 (e.g., the autonomy computing system 130) can identify one or more objects that are proximate to the vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160, the motion planning system 165, and/or other system(s).

The prediction system 160 can be configured to predict a motion of the object(s) within the surrounding environment of the vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the vehicle 105 (e.g., due to an overriding factor). In some implementations, the motion plan 180 may define the vehicle's motion such that the vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the vehicle 105 (e.g., multiple times per second). Each new motion plan can describe a motion of the vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 100 can cause the vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the vehicle 105 to autonomously travel within the vehicle's surrounding environment.

The autonomous vehicle 105 can be associated with a variety of different parties. In some implementations, the autonomous vehicle 105 can be associated with a vehicle provider. The vehicle provider can include, for example, an owner, a manufacturer, a vendor, a manager, a coordinator, a handler, etc. of the autonomous vehicle 105. The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system that is remote from the autonomous vehicle 105 to communicate (e.g., over one or more wireless communication channels) with the vehicle computing system 100 of the autonomous vehicle 105. The vehicle provider computing system can include a server system (e.g., of an entity), a user device (e.g., of an individual owner), and/or other types of computing systems.

Additionally, or alternatively, the autonomous vehicle can be associated with a service entity. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s)/robot(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

The autonomous vehicle 105 can be configured to perform vehicle services for one or more service entities. An autonomous vehicle 105 can perform a vehicle service by, for example and as further described herein, travelling (e.g., traveling autonomously) to a location associated with a requested vehicle service, allowing user(s), robot(s), and/or item(s) to board or otherwise enter the autonomous vehicle 105, transporting the user(s), robot(s), and/or item(s), allowing the user(s), robot(s), and/or item(s) to deboard or otherwise exit the autonomous vehicle 105, etc. In this way, the autonomous vehicle 105 can provide the vehicle service(s) for a service entity to a user and/or a vendor, as further described herein.

Each service entity can be associated with a respective telecommunications network system of that service entity. A telecommunications network system can include the infrastructure to facilitate communication between the autonomous vehicle 105 and the various computing systems of the associated service entity that are remote from the autonomous vehicle 105. For example, a service entity can utilize an operations computing system 200 to communicate with, coordinate, manage, etc. autonomous vehicle(s) to perform the vehicle services of the service entity. A telecommunications network system can allow an autonomous vehicle 105 to utilize the back-end functionality of the respective operations computing system 200 (e.g., service assignment allocation, vehicle technical support, etc.).

An operations computing system 200 can include one or more computing devices that are remote from the autonomous vehicle 105 (e.g., located off-board the autonomous vehicle 105). For example, such computing device(s) can be components of a cloud-based server system and/or other type of computing system that can communicate with the vehicle computing system 100 of the autonomous vehicle 105, another computing system (e.g., a vehicle provider computing system, etc.), a user device, etc. The operations computing system 200 can be or otherwise included in a data center for the service entity, for example. The operations computing system 200 can be distributed across one or more location(s) and include one or more sub-systems. The computing device(s) of an operations computing system 200 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system (e.g., the one or more processors, etc.) to perform operations and functions, such as communicating data to and/or obtaining data from vehicle(s), etc.

In some implementations, the operations computing system 200 and the vehicle computing system 100 can indirectly communicate. For example, a vehicle provider computing system can serve as an intermediary between the operations computing system 200 and the vehicle computing system 100 such that at least some data is communicated from the operations computing system 200 (or the vehicle computing system 100) to the vehicle provider computing system and then to the vehicle computing system 100 (or the operations computing system 200).

Figure 2:
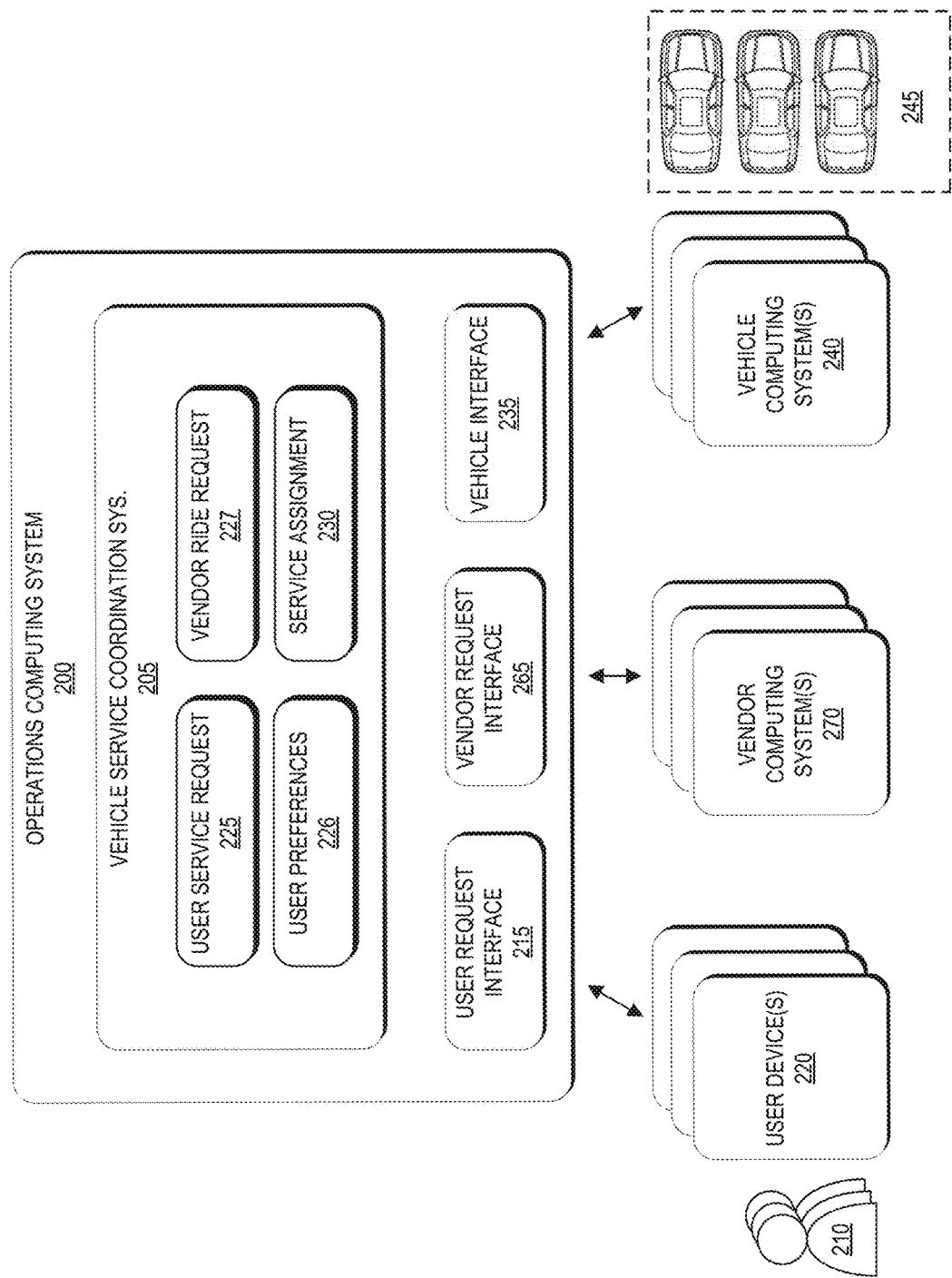
FIG. 2 depicts an example operations computing system, according to example embodiments of the present disclosure.

An operations computing system 200 can be configured to select and assign tasks to autonomous vehicles. FIG. 2 depicts the example operations computing system 200 according to example embodiments of the present disclosure. The operations computing system 200 can be associated with one or more service entities. The operations computing system 200 can include, for example, a vehicle service coordination system 205, and/or other systems.

The vehicle service coordination system 205 can be configured to coordinate the provision of one or more vehicle services to one or more users 210. In some implementations, the operations computing system 200 can include a user request interface 215. The user request interface 215 can allow the operations computing system 200 to communicate with one or a plurality of user devices 220 (e.g., mobile phones, desktops, laptops, tablets, game systems, etc.). The user request interface 215 can allow the operations computing system 200 and the user device(s) 220 to communicate data to and/or from one another. As an example, the user device(s) 220 can communicate (e.g., via the user request interface 215) data indicative of a user service request 225 for a vehicle service to an operations computing system 200 associated with a service entity. As another example, the user device(s) 220 can communicate (e.g., via the user request interface 215) data indicative of user preferences 226 for a vehicle service to an operations computing system 200 associated with a service entity.

In some implementations, the operations computing system 200 can include a vendor request interface 265. The vendor request interface 265 can allow the operations computing system 200 to communicate with one or a plurality of vendor computing systems 270 (e.g., mobile phone(s), tablet(s), laptop(s), personal computer(s), etc.). The vendor request interface 265 can allow the operations computing system 200 and the vendor computing system(s) 270 to communicate data to and/or from one another. For example, the vendor computing system(s) 270 can communicate (e.g., via the vendor request interface 265) data indicative of a vendor ride request 227 for a vehicle service to an operations computing system 200 associated with a service entity. The vendor ride request 227 can include a request for a vehicle service associated with an autonomous robot. In some implementations, the vendor ride request 227 can include an amount of cabin space in a vehicle that will be used by the autonomous robot. As an example, the vendor ride request 227 can include a first request for a vehicle service associated with a first autonomous robot, and one unit of cabin space in association with the first autonomous robot. As another example, the vendor ride request 227 can include a second request for a vehicle service associated with a second autonomous robot, and two units of cabin space in association with the second autonomous robot.

The vehicle service coordination system 205 can be configured to generate a service assignment 230. The service assignment 230 can be indicative of a vehicle service (e.g., requested by a user via the user device(s) 220) to be performed by a vehicle (e.g., an autonomous vehicle). The service assignment 230 can include a variety of information associated with the vehicle service, the requesting user, the requesting vendor, the user device, the vendor computing system, the service entity, etc. For example, the service assignment 230 can include data indicative of an associated user and/or user device (if permitted), data indicative of one or more autonomous robots, data indicative of one or more locations (e.g., origin location, destination location, service-start location, service-end location, ride-start location, ride-end location, etc.), data indicative of a type of vehicle service (e.g., transportation service, delivery service, courier service, etc.), data indicative of the type of cargo for the vehicle service (e.g., passengers, luggage, packages, food, time-sensitive mail, etc.), data indicative of a vehicle type/size (e.g., sedan, sport utility vehicle, luxury vehicle, etc.), data indicative of one or more time constraints (e.g., pick-up times, drop-off times, time limits for delivery, service duration, etc.), data indicative of service preferences (e.g., music, temperature, etc.), data indicative of one or more vehicle service parameters (e.g., luggage types, handle-with-care instructions, special pick-up requests, etc.), data indicative of the vehicle capacity required/preferred for the vehicle service (e.g., the number of seats with seatbelts, an amount of trunk space, an amount of cabin space, etc.), data indicative of a service cost of the vehicle service, and/or other types of data.

The operations computing system 200 (e.g., the vehicle service coordination system 205) can identify one or more autonomous vehicles that are available for a service assignment 230. The vehicle service coordination system 205 can identify autonomous vehicle(s) that are online with the service entity associated with the operations computing system 200. The vehicle service coordination system 205 can select an autonomous vehicle for the service assignment 230 based at least in part on the data indicated in the service assignment 230. For example, the vehicle service coordination system 205 can select an autonomous vehicle that meets the preferences of the user/vendor, has the necessary capacity, is the requested vehicle type, etc. Additionally, or alternatively, the vehicle service coordination system 205 can select an autonomous vehicle based at least in part on the current and/or future location of the autonomous vehicle. For example, the vehicle service coordination system 205 can select an autonomous vehicle that is proximate to an origin location associated with the service assignment 230. Additionally, or alternatively, the vehicle service coordination system 205 can select an autonomous vehicle that is within and/or nearby a geographic area that includes the origin location and/or destination location of the service assignment 230.

The operations computing system 200 can utilize a vehicle interface 235 to communicate data indicative of a service assignment 230 to one or more vehicle computing systems 240 of one or more autonomous vehicles 245. The vehicle computing system(s) 240 can include the vehicle computing system 100 and/or be configured in similar manner (e.g., as shown in FIG. 1) and the autonomous vehicle(s) 245 can include the autonomous vehicle 105. The vehicle interface 235 can allow the operations computing system 200 and one or a plurality of vehicle computing systems 240 (e.g., of one or a plurality of autonomous vehicles 245) to communicate data to and/or from one another. For example, the operations computing system 200 can communicate, via the vehicle interface 235, data indicative of a service assignment 230 to one or more vehicle computing system(s) 240 of the autonomous vehicles 245 that the operations computing system 200 selects for the service assignment 230. Additionally, or alternatively, the vehicle computing system(s) 240 can communicate data associated with the autonomous vehicle(s) 245 to the operations computing system 200. In this way, the operations computing system 200 can coordinate the performance of vehicle service(s) for user(s) by the autonomous vehicle(s) 245 as well as monitor the autonomous vehicle(s) 245. The autonomous vehicle(s) 245 can include and/or be configured in the same or a similar manner to the autonomous vehicle 105 shown in FIG. 1.

In some implementations, the operations computing system 200 can select a non-autonomous vehicle (e.g., human driven vehicle) for a service assignment 230. For example, the vehicle service coordination system 205 can select a non-autonomous vehicle that is proximate to a location associated with the service assignment 230. Additionally, or alternatively, the vehicle service coordination system 205 can select a non-autonomous vehicle that is within and/or nearby a geographic area that includes the origin location and/or destination location of the service assignment 230. The operations computing system 200 can communicate data indicative of a service assignment 230 to one or more computing devices associated with the selected non-autonomous vehicle (e.g., a mobile device of the vehicle operator). The service assignment 230 can be indicative of a request that the operator provide the requested vehicle service to a user associated with the service assignment 230.

In some implementations, the operations computing system 200 can communicate with one or more vehicle provider computing systems (associated with one or more vehicle providers) (not shown) via a vehicle provider interface (not shown). The vehicle provider computing system(s) can be associated with vehicle provider(s) that are associated with the autonomous vehicle(s) 245. A vehicle provider can include, for example, an owner, a manufacturer, a vendor, a manager, a coordinator, a handler, etc. of the autonomous vehicle 105 (e.g., a third party, etc.). The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system that is remote from the autonomous vehicle 105 to communicate (e.g., over one or more wireless communication channels) with the vehicle computing system(s) 240 of one or more autonomous vehicles 245. A vehicle provider computing system can include a server system (e.g., of an entity), a user device (e.g., of an individual owner), and/or other types of computing systems.

The vehicle provider interface can allow the operations computing system 200 and one or a plurality of vehicle provider computing systems (e.g., of one or more vehicle providers, etc.) to communicate data to and/or from one another. For example, the operations computing system 200 can communicate, via the vehicle provider interface, data indicative of a service assignment 230, and/or other data as described herein, to one or more vehicle provider computing system(s). The vehicle provider computing system(s) can then communicate such data to the vehicle computing system(s) 240. Additionally, or alternatively, the vehicle provider computing system(s) can communicate data associated with one or more autonomous vehicles 245 (and/or other data) to the operations computing system 200.

A service entity may have varying levels of control over the vehicle(s) that perform its vehicle services. In some implementations, a vehicle can be included in the service entity's dedicated supply of vehicles. The dedicated supply can include vehicles that are owned, leased, or otherwise exclusively available to the service entity (e.g., for the provision of its vehicle service(s), other tasks, etc.) for at least some period of time. This can include, for example, an autonomous vehicle 245 that is associated with a vehicle provider, but that is online only with that service entity (e.g., available to accept service assignments for only that service entity, etc.) for a certain time period (e.g., a few hours, a day, week, etc.).

In some implementations, a vehicle can be included in the service entity's non-dedicated supply of vehicles. This can include vehicles that are not exclusively available to the service entity. For example, an autonomous vehicle 245 that is currently online with two different service entities so that the autonomous vehicle 245 may accept service assignment 230 from either service entity (e.g., from the operations computing systems associated therewith, etc.) may be considered to be part of a non-dedicated supply of autonomous vehicles. In some implementations, whether a vehicle is considered to be part of the dedicated supply or the non-dedicated supply can be based, for example, on an agreement between the service entity and a vehicle provider associated with the autonomous vehicle 245.

According to aspects of the present disclosure, the operations computing system 200 can be configured to generate a service assignment 230 that include the concurrent transportation of user(s) and autonomous robot(s). FIG. 9 depicts an example autonomous robot 900 according to example aspects of the present disclosure. For instance, the autonomous vehicle can transport an autonomous robot concurrently with a user in order to pool its transportation services and, thus, decreasing the cost to the user. The autonomous robot can be, for example, a ground-travel based autonomous robot. In some implementations, the autonomous vehicle can include one or more designated positions within the autonomous vehicle for an autonomous robot. A designated position can include, for example, a designated area within a grid-like floor pattern in the interior of the vehicle's cabin. The autonomous robot can be positioned at one of these designated portions when the autonomous robot is onboard the autonomous vehicle.

The autonomous robot can be configured to perform one or more services. For example, the autonomous robot can be utilized for transporting one or more items. The items can include, for example, food, electronics, toiletries, tools, construction materials, reading material, flowers, toys, medicine, perishable items, non-perishable items, and/or any other items. The items can include items intended to be delivered to a user and/or entity (e.g., ordered by a user onboard the autonomous vehicle, based on the transportation of the autonomous robot via the autonomous vehicle, etc.), items available for purchase (e.g., by a user of the corresponding autonomous vehicle, by a user at a destination location, etc.), items available for rent (e.g., by a user of the corresponding autonomous vehicle, by a user at a destination location, etc.), and/or other types of items.

The autonomous robot can be associated with a variety of parties. For instance, in some implementations, an autonomous robot can be associated with a service entity. This can be the same service entity for which the autonomous vehicle is providing vehicle service(s). The service entity can allow a third party to use, lease, rent, etc. the autonomous robot to transport items associated with the third party. In some implementations, the autonomous robot can be associated with a user of the autonomous vehicle. For example, the user can utilize the autonomous robot to transport items for the user and/or delivery items to the user while the user is riding in the autonomous vehicle. In some implementations, the autonomous robot can be associated with a third party. The third party can include, for example, a retailer, a service provider, a shipper, and/or other types of entities. The third party can utilize the autonomous robot to transport items, as described herein.

The autonomous robot can include an infrastructure that allows it to transport items, autonomously travel, and integrate with the system(s) of an autonomous vehicle. For instance, the autonomous robot can include means for transporting an item. The autonomous robot can include a main body 902 (with a frame) that includes one or more compartments 904a-904c. Each of the compartments 904a-904c can be configured to provide support for transporting one or more item(s). The compartment(s) 904a-904c can be different sizes, shapes, etc. and/or can be configured to transport different items (e.g., cold food in one compartment, hot food in another compartment, etc.). The compartment(s) 904a-904c can be physically separated from the other compartment(s). In some implementations, the compartment(s) 904a-904c can be thermally separated from the other compartment(s) such that the compartment(s) 904a-904c can have different thermal conditions (e.g., temperature, humidity, etc.). In some implementations, the compartment(s) 904a-904c can include a lock (e.g., mechanical lock, magnetic lock, electronic lock, etc.). The lock can be adjusted between a locked state and an unlocked state to secure items while in transport and to allow for retrieval by an authorized user.

The autonomous robot can also include means for allowing the autonomous robot to move along a ground surface, into an autonomous vehicle, etc. For instance, the autonomous robot can include a mobility assembly 908 affixed to the main body 902. The mobility assembly 908 can include, for example, two or more wheels 906 (e.g., self-balancing wheel assembly, etc.), tracks, and/or other mechanism(s) for allowing the autonomous robot to traverse a surface. The mobility assembly 908 can be connected to a powertrain and/or other type of drive mechanism that is configured help start, maintain, reduce, etc. the motion of the mobility assembly 908.

The autonomous robot can include means for autonomously controlling the motion of the autonomous robot. For instance, the autonomous robot can include one or more sensors, a computing system, and a positioning system. The sensor(s) can be configured to obtain sensor data associated with a surrounding environment of the autonomous robot. The sensor(s) can include, for example, cameras (e.g., mono cameras, infrared cameras, stereo cameras, etc.), Light Detection and Ranging (LIDAR) systems, Range Detection and Ranging (RADAR) systems, and/or other types of sensors. The onboard computing system of the autonomous robot can be operable with the sensor(s) for obtaining the sensor data (e.g., via a bus, etc.). The computing system (e.g., including processor(s), memory, etc.) can be configured to plan a motion of the autonomous robot based at least in part on the sensor data. For instance, the computing system can include an autonomy system for perceiving objects in the surrounding environment (e.g., by analyzing the sensor data), predicting future locations and/or paths associated with such objects, and generating a motion plan that navigates through the surrounding environment based on map data as well as the predicted location of surrounding objects, as similarly described herein for the autonomous vehicle of FIG. 1. Control signals can be outputted to control the motion of the autonomous robot in accordance with the motion plan. For example, the computing system can be operably connected to the mobility assembly 908 (a control system associated therewith) for controlling the motion of the autonomous robot (e.g., to cause the wheels, tracks, etc. to turn).

The positioning system of the autonomous robot can be configured to determine a specific location of the autonomous robot relative to a geographic coordinate system, a specific target destination location, a location of an autonomous vehicle, and/or other locations. The positioning system can determine actual or relative position by using a satellite navigation positioning system (e.g., a GPS system), an inertial navigation system, a dead reckoning system, based on IP address, by using triangulation and/or proximity to cellular towers or WiFi hotspots, and/or other suitable techniques for determining position. The positioning system can allow the autonomous robot to localize itself within its surrounding environment.

The autonomous robot can include means for securing the autonomous robot to the autonomous vehicle. For instance, the autonomous robot can include a coupling assembly configured to temporarily secure the autonomous robot to an autonomous vehicle. The coupling assembly can include one or more pins, locks, magnets, latches, hooks, etc. that can securely attach the autonomous robot to the autonomous vehicle. This can help keep the autonomous robot stationary while onboard the autonomous vehicle. In some implementations, the coupling assembly can provide an interface for transferring data and/or other resources between the autonomous robot and the autonomous vehicle.

The autonomous robot can include one or more systems that are configured to interface with the onboard system(s) of an autonomous vehicle. This can include, for example, a power system, a ventilation system, a climate management system, a drainage system, a communication system, and/or other system(s). These systems can connect to the autonomous vehicle to utilize the onboard systems of the autonomous vehicle via one or more interfaces. This can allow the autonomous robot to leverage the onboard systems of the autonomous vehicle when the autonomous robot is onboard the autonomous vehicle.

Figure 3A:
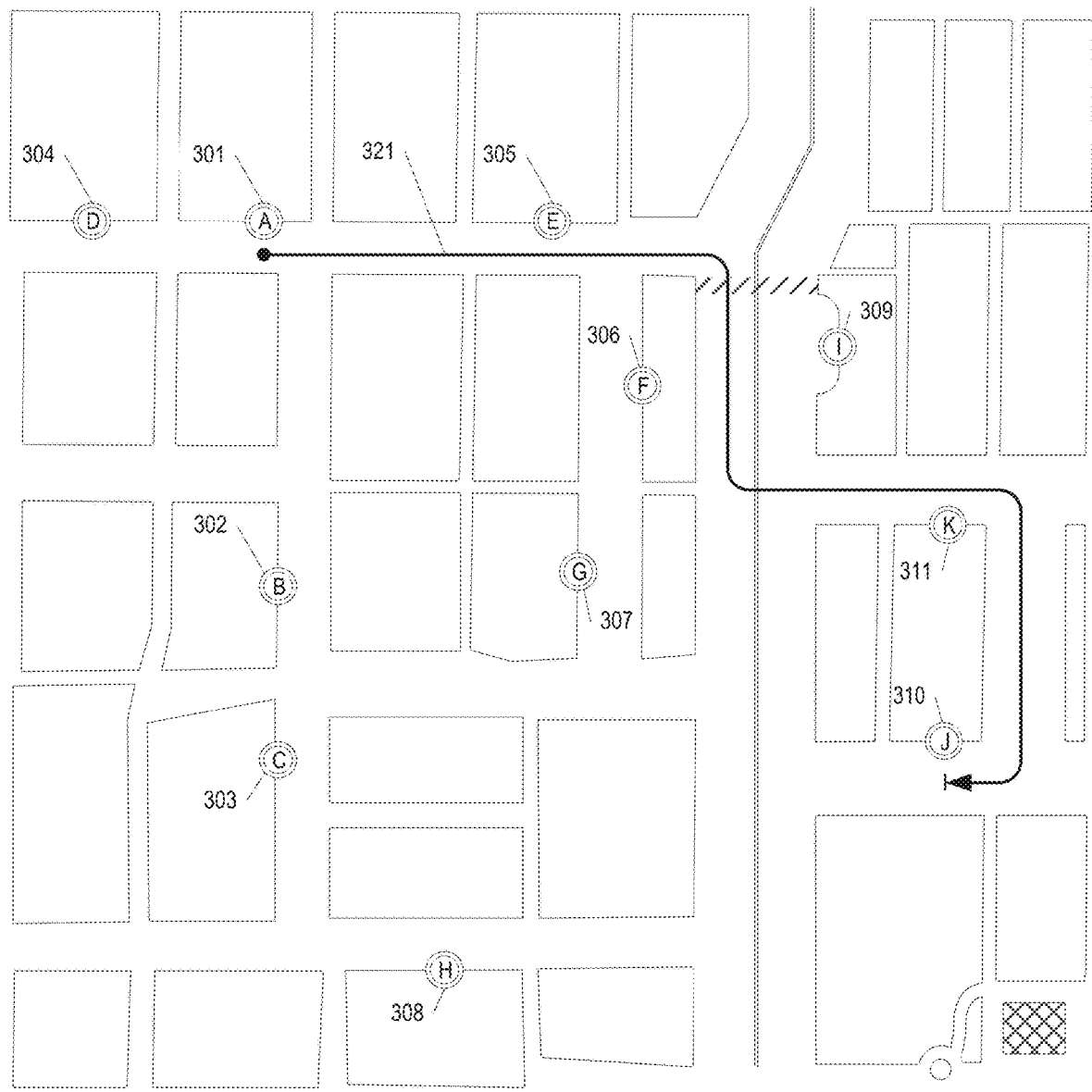
FIGS. 3A-3D depict diagrams of example candidate routes for a vehicle service, according to example embodiments of the present disclosure.

The operations computing system 200 can be configured to generate service assignments for an autonomous vehicle to concurrently transport a user and an autonomous robot based on candidate vehicle route(s) and/or service configurations. FIGS. 3A-3D depict example candidate routes, according to example embodiments of the present disclosure. For instance, the operations computing system 200 can obtain user service request 225 from the user device(s) 220 via the user request interface 215. The user service request 225 can indicate a service request for a vehicle service (e.g., transportation service) to transport a user from location 301 to location 310. The operations computing system 200 can determine a plurality of candidate routes for user service request 225. As shown in FIG. 3A, the operations computing system 200 can determine a main candidate route 321 from location 301 (e.g., to pick-up a user) to location 310 (e.g., to drop-off the user) that does not include any deviations for ridesharing.

Figure 3B:
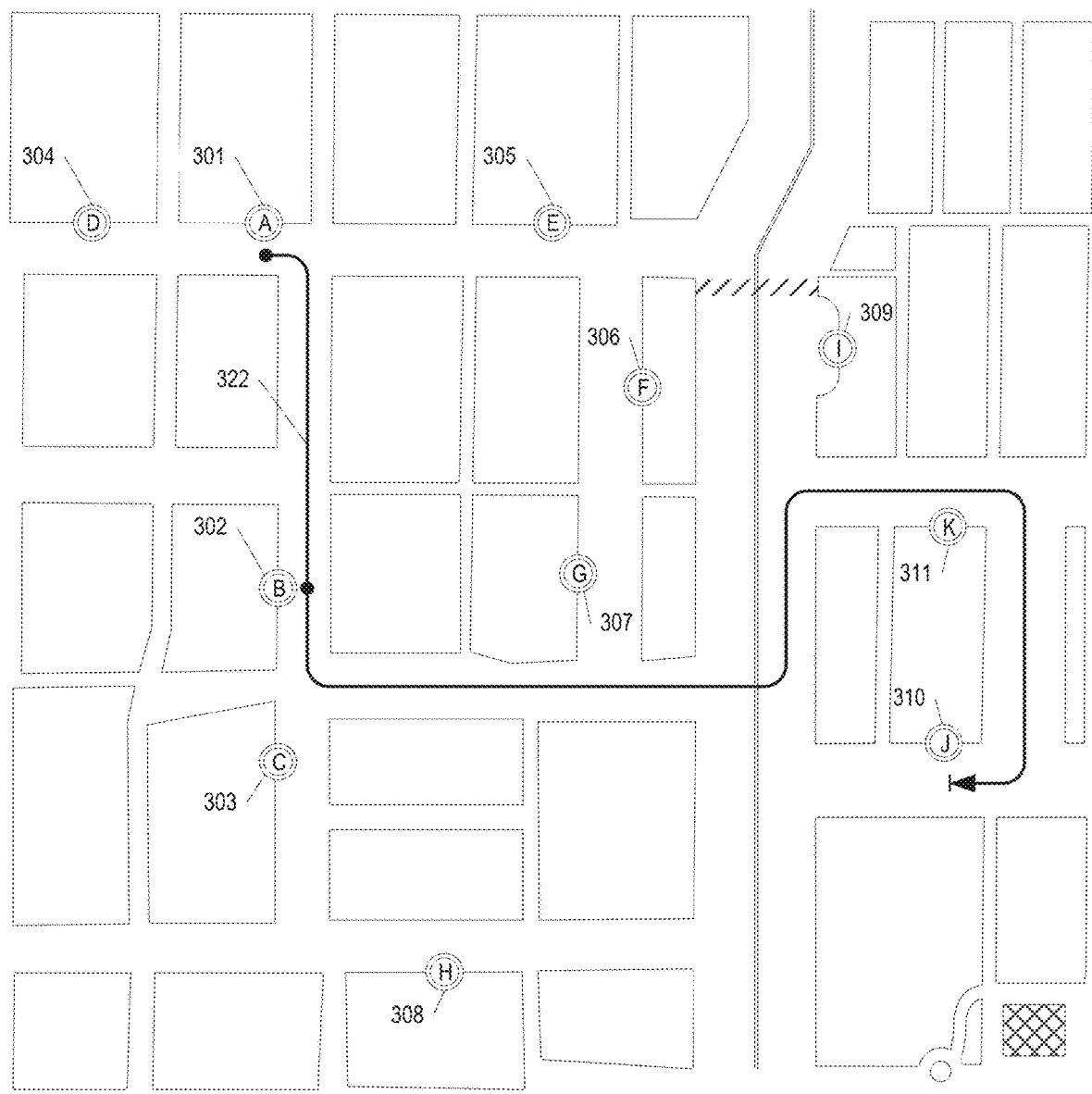

As shown in FIG. 3B, the operations computing system 200 can determine a detour candidate route 322 between location 301 and location 310. For example, the operations computing system 200 can obtain vendor service request 227 from the vendor computing system(s) 270 via the vendor request interface 265. The vendor service request 227 can indicate one or more service requests for a vehicle service to transport one or more autonomous robots. The operations computing system 200 can determine a plurality of candidate stops (e.g., candidate stops 301-311) that are proximate to the main candidate route 321, based at least in part on the vendor ride request 227. In particular, if the vendor service request 227 indicates a service request to transport an autonomous robot from location 302 to location 310, then the plurality of candidate stops can include the locations 302 and 310, and the operations computing system 200 can determine the detour candidate route 322 from location 301 (e.g., to pick-up the user) to location 302 (e.g., to pick-up the autonomous robot) and then to location 310 (e.g., to drop-off the user and the autonomous robot).

Figure 3C:
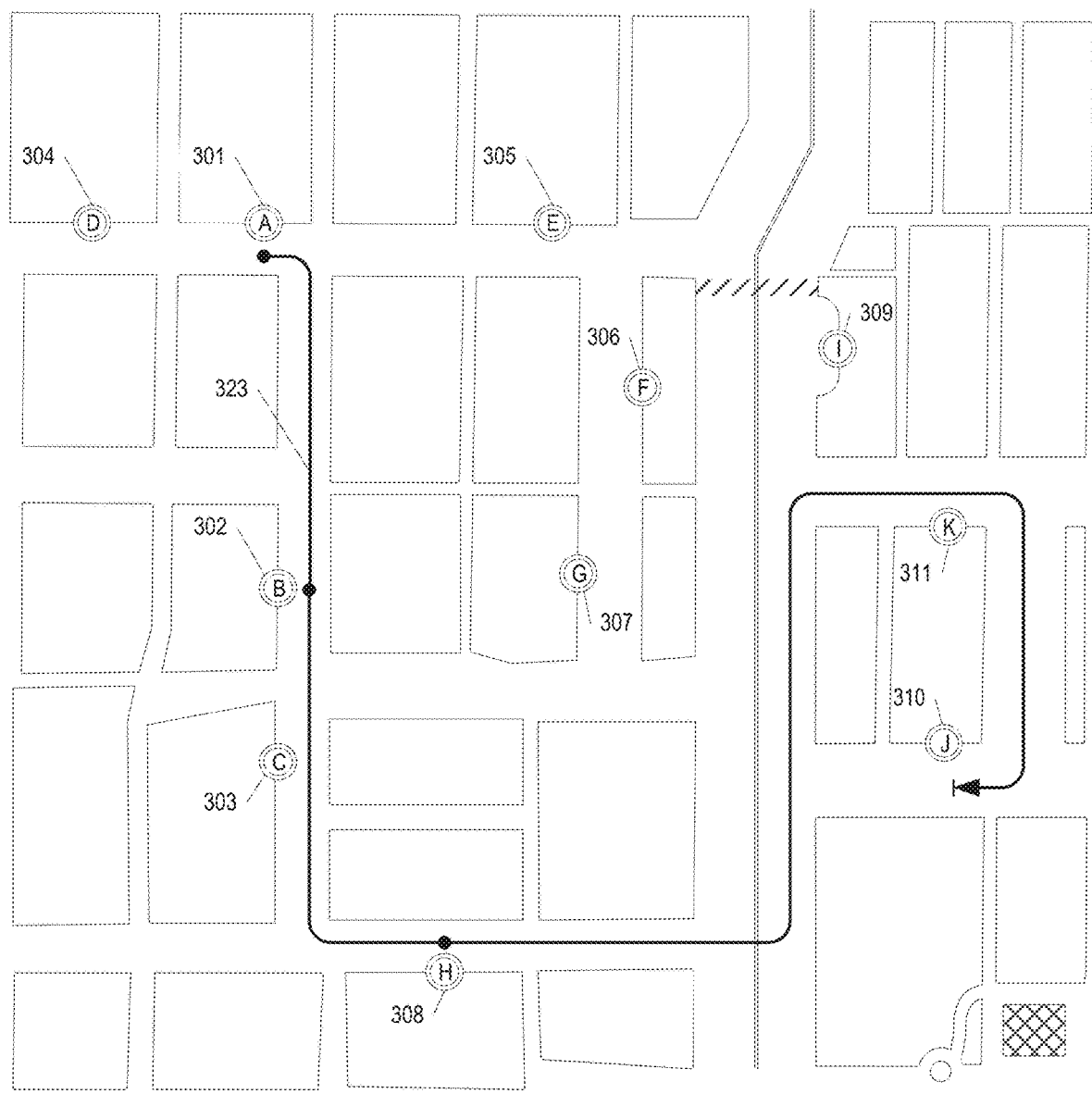

As shown in FIG. 3C, the operations computing system 200 can determine a detour candidate route 323 between location 301 and location 310. For example, if the vendor ride request 227 indicates a service request to transport an autonomous robot from location 302 to location 308, then the plurality of candidate stops can include the locations 302 and 308, and the operations computing system 200 can determine the detour candidate route 323 from location 301 (e.g., to pick-up the user) to location 302 (e.g., to pick-up the autonomous robot) to location 308 (e.g., to drop-off the autonomous robot), and then to location 310 (e.g., to drop-off the user).

Figure 3D:
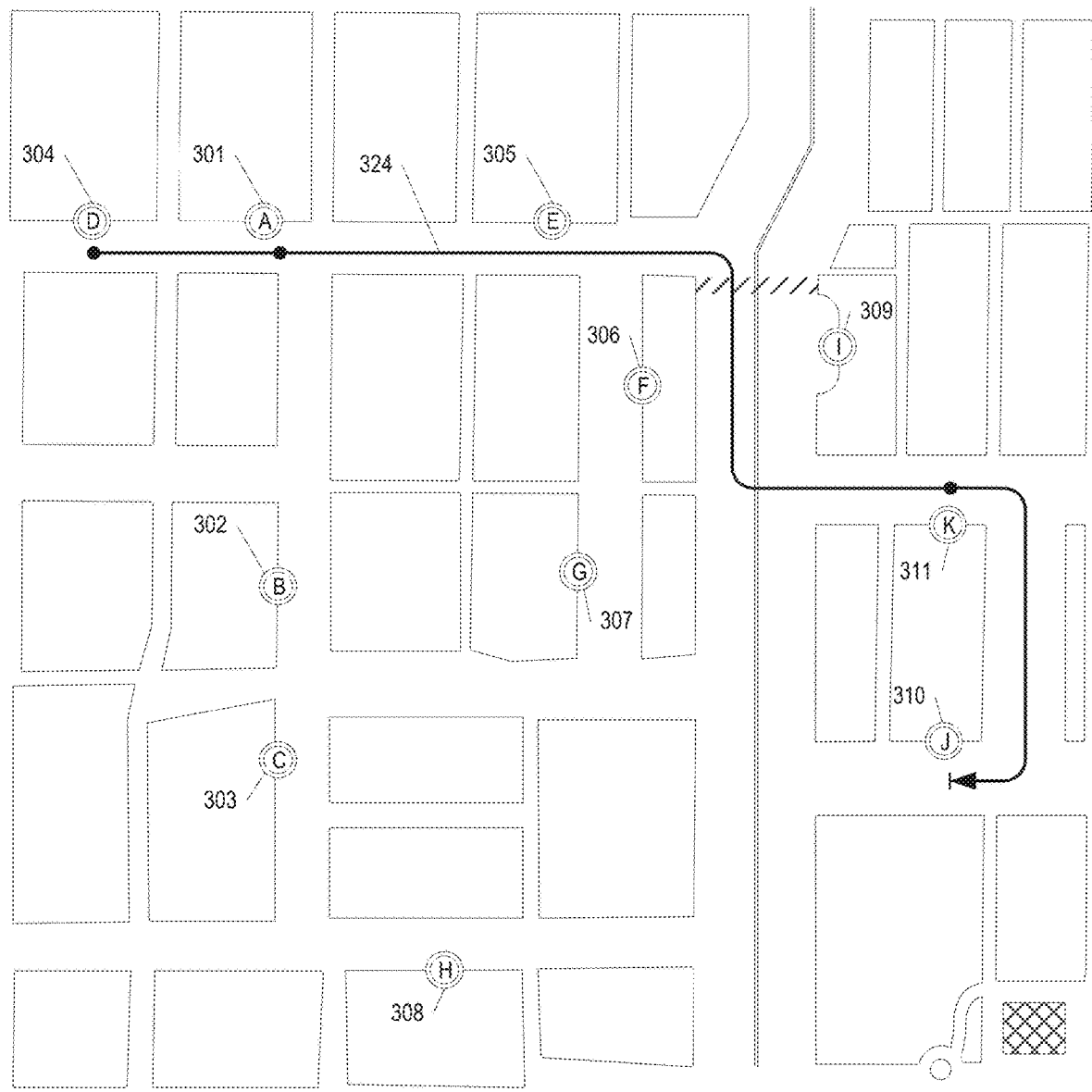

As shown in FIG. 3D, the operations computing system 200 can determine a detour candidate route 324 between location 301 and location 310. For example, if the vendor ride request 227 indicates a service request to transport an autonomous robot from location 304 to location 303, then the plurality of candidate stops can include the locations 304 and 311, and the operations computing system 200 can determine the detour candidate route 324 from location 304 (e.g., to pick-up the autonomous robot) to location 302 (e.g., to pick-up the user) to location 311 (e.g., to drop-off the autonomous robot), and then to location 310 (e.g., to drop-off the user).

Figure 4:
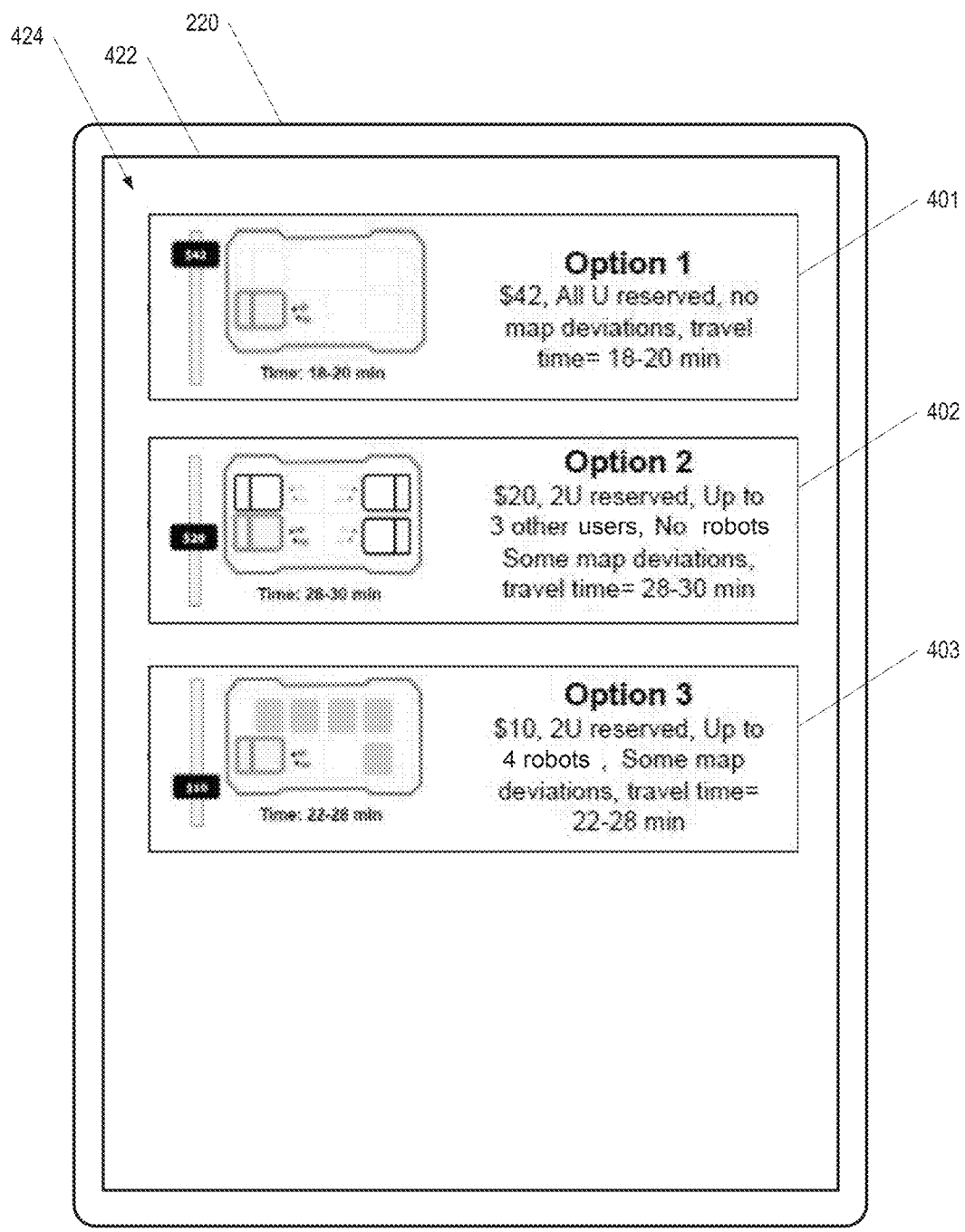
FIG. 4 depicts example service configurations for a vehicle service, according to example embodiments of the present disclosure.

FIG. 4 depicts example service configurations for a vehicle service, according to example embodiments of the present disclosure. As shown in FIG. 4, a user device 220 can display the service configurations 401, 402, and 403. For example, the operations computing system 200 can obtain user service request 225 from a user device 220 via the user request interface 215. The user service request 225 can indicate a service request for a vehicle service (e.g., transportation service) to transport a user from a service-start location to a service-end location. The operations computing system 200 can determine a plurality of candidate routes for the user service request 225, and determine the service configurations 401, 402, and 403 based at least in part on a travel time, available cabin space, and/or service cost associated with each of the plurality of candidate routes. The user device 220 can allow the user to provide input indicative of a preferred service configuration or a range of preferred service configurations (e.g., user preferences 226) from the service configurations 401, 402, and 403, via the user interface 424.

The travel time associated with a candidate route can indicate, for example, the time associated with transporting the user from the service-start location to the service-end location via the candidate route. The operations computing system 200 can determine the service configuration 401 based on a shortest travel time associated with the plurality of candidate routes. For example, the service configuration 401 can include a plurality of candidate routes that are associated with a travel time of "18-20 minutes."

The available cabin space associated with a candidate route can indicate, for example, the cabin space available to the user inside an autonomous vehicle that is transporting the user from the service-start location to the service-end location via the candidate route. The operations computing system 200 can determine the service configuration 402 based on available cabin space associated with the plurality of candidate routes. For example, the service configuration 402 can include a plurality of candidate routes that are associated with "up to 3 other users" and "no autonomous robots." If the user selects service configuration 402, then the user can share an available cabin space inside an autonomous vehicle with "up to 3 other users" and "no autonomous robots."

The service cost associated with a candidate route can indicate, for example, a cost to the user for transporting the user from the service-start location to the service-end location via the candidate route. The operations computing system 200 can determine the service configuration 403 based on a lowest service cost associated with the plurality of candidate routes. For example, the service configuration 403 can include a plurality of candidate routes that are associated with a service cost of "$10." The operations computing system 200 can provide data indicative of the service configurations 401, 402, and 403 to the user device 220, and the user device 220 can display the service configurations 401, 402, and 403 to a user via user interface 424 on a display device 422 of the user device 220.

Figure 5B:
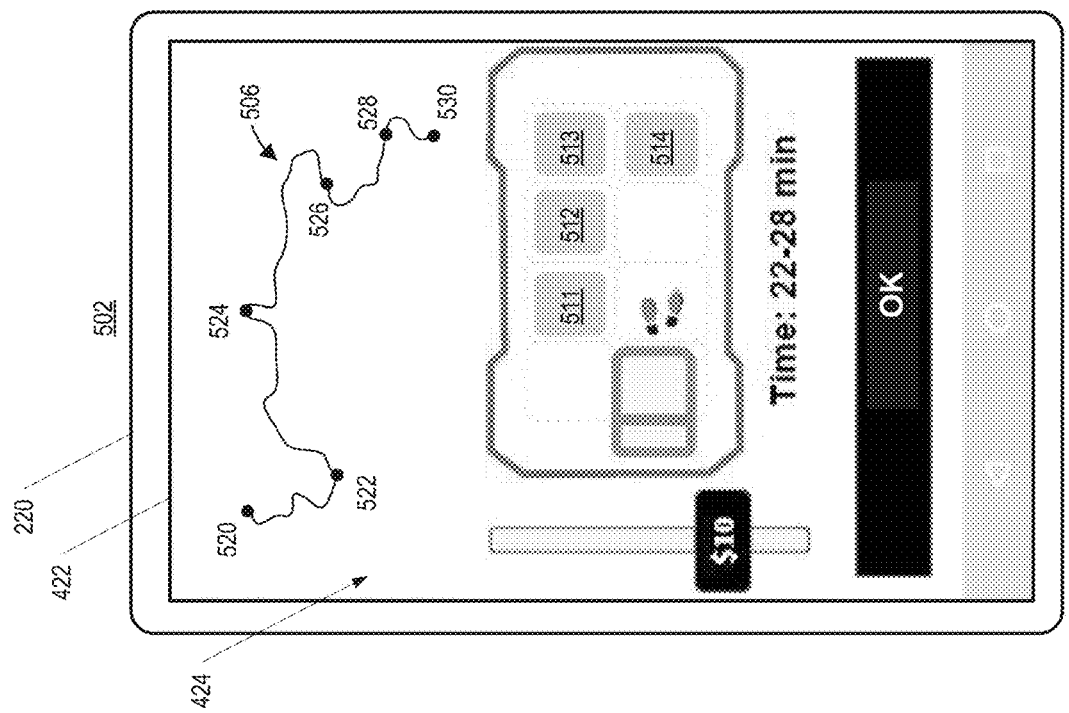
FIGS. 5A and 5B depict example preferred service configurations for a vehicle service, according to example embodiments of the present disclosure.
Figure 5A:
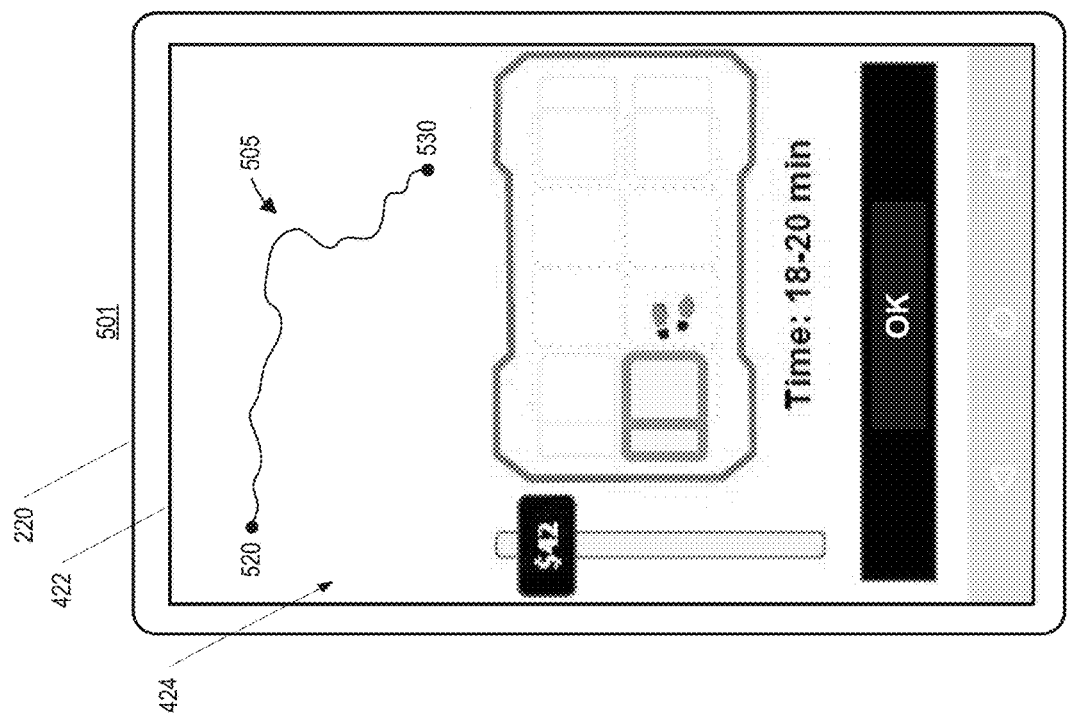

FIGS. 5A and 5B depict example preferred service configurations, according to example embodiments of the present disclosure. For example, the operations computing system 200 can obtain a user service request 225 from a user device 220 via the user request interface 215. The user service request 225 can indicate a service request for a vehicle service (e.g., transportation service) to transport a user from location 520 to location 530. The operations computing system 200 can determine and provide data indicative of a plurality of service configurations to the user device 220. The user device 220 can display the plurality of service configurations to the user and allow the user to indicate (e.g., via user interface 424) user preferences 226 indicative of a preferred service configuration or a range of preferred service configurations from the plurality of service configurations. As shown in FIG. 5A, the user device 220 can display service configuration 501 (e.g., via user interface 424 on display device 422) that the user has indicated as the preferred service configuration. The service configuration 501 can include candidate route 505 from location 520 to location 530. The candidate route 505 can be associated with a travel time of "18-20 minutes," a maximum available cabin space, and a service cost of "$42." Alternatively, as shown in FIG. 5B, the user device 220 can display service configuration 502 (e.g., via user interface 424 on display device 422) that the user has indicated as the preferred service configuration. The service configuration 502 can include candidate route 506 between location 520 and location 530, and intersecting locations 522, 524, 526, and 528. The candidate route 506 can be associated with a travel time of "22-28 minutes," an available cabin space that includes autonomous robots 511-514, and a service cost of "$10."

Figure 6:
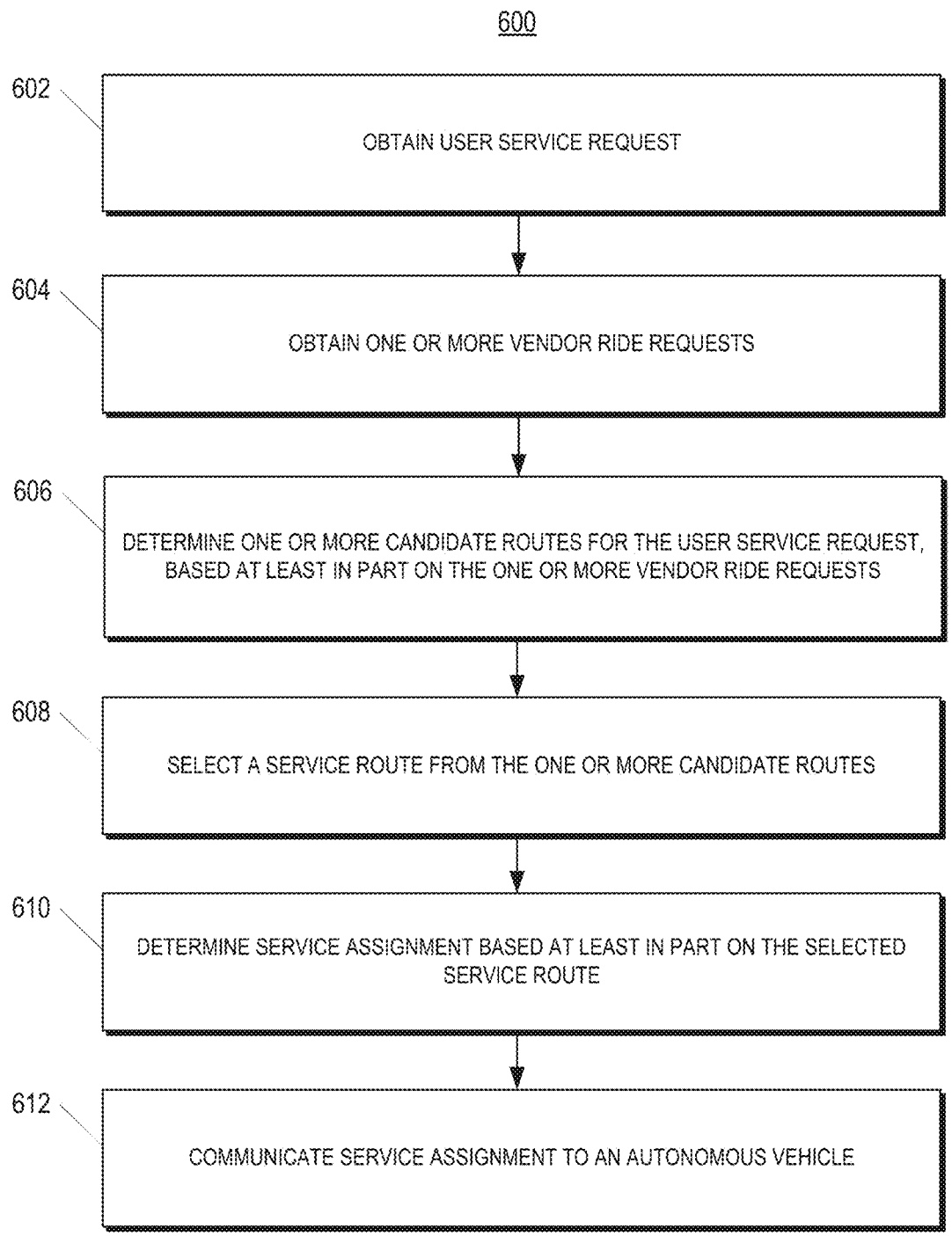
FIG. 6 depicts a flow diagram of an example method for providing an autonomous vehicle service, according to example implementations of the present disclosure.

FIG. 6 depicts a flow diagram of an example method 600 for providing an autonomous vehicle service according to example implementations of the present disclosure. One or more portion(s) of the method 600 can be can be implemented by a computing system that includes one or more computing devices such as, for example, the computing systems described with reference to the other figures (e.g., vehicle computing system 100, operations computing system 200, user device(s) 220, vehicle computing system(s) 245, vendor computing system(s) 270, vehicle computing system 805, remote computing system 850, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1, 2, 7, and/or 8), for example, to provide the autonomous vehicle service. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for example illustrated purposes and is not meant to be limiting. One or more portions of method 600 can be performed additionally, or alternatively, by other systems.

At (602), the method 600 can include obtaining a user service request. For example, the operations computing system 200 can obtain data indicative of user service request 225. The user service request 225 can include a service-start location and a service-end location for a service associated with a user. The operations computing system 200 can obtain the data indicative of user service request 225 from one or more user device(s) 220 via the user request interface 215. In some implementations, user service request 225 can include a cabin-space request for the service. The cabin space request can indicate a minimum amount of cabin space desired by the user for the service. For example, if a user is traveling with luggage or other items that the user would like to keep inside the vehicle's cabin, then the user can indicate (e.g., via user input associated with user interface 424 of an application on the user device 420) a minimum amount of cabin space in the user service request 225 for the luggage or other items.

At (604), the method 600 can include obtaining one or more vendor ride requests. For example, the operations computing system 200 can obtain data indicative of vendor ride request 227 for the transportation of one or more autonomous robots. The operations computing system 200 can obtain the data indicative of vendor ride request 227 from one or more vendor computing system(s) 270 via the vendor request interface 265. In some implementations, vendor ride request 227 can include a ride-start location and a ride-end location for the transportation of each of the one or more the autonomous robots. In some implementations, vendor ride request 227 can include an amount of cabin space associated with each of the one or more autonomous robots. The amount of cabin space associated with an autonomous robot can indicate an amount of cabin space that will be used by the autonomous robot inside an autonomous vehicle that is transporting the autonomous robot.

At (606), the method 600 can include determining one or more candidate routes for the user service request, based at least in part on the one or more vendor ride requests. For example, the operations computing system 200 can determine the one or more candidate routes between the service-start location and the service-end location for the autonomous vehicle based at least in part on vendor ride request 227. For example, the operations computing system 220 can determine one or more candidate stops based at least in part on the one or more ride-start locations (e.g., ride-start location associated with each of the one or more autonomous robots) and the one or more ride-end locations (e.g., ride-end location associated with each of the one or more autonomous robots) indicated by vendor ride request 227, as described herein. The one or more candidate stops can include a candidate stop corresponding to each of the one or more ride-start locations and ride-end locations. In some implementations, the operations computing system 200 can filter the one or more candidate stops based on, for example, a detour distance, detour time, or cargo space. As an example, the operations computing system 200 can determine a distance of each candidate stop from the main candidate route (e.g., detour distance), and filter the plurality of candidate stops to include candidate stops that are associated with a detour distance that is less than a threshold detour distance (e.g., less than 0.5, 1, 2 miles, etc.). As another example, the operations computing system 200 can determine a time to travel to each candidate stop from the main candidate route, and filter the plurality of candidate stops to include candidate stops that are associated with a detour time that is less than a threshold detour time (e.g., less than 1, 2, 5, 10 minutes, etc.).

In some implementations, the operations computing system 200 can determine a main candidate route between the service-start location and the service-end location indicated by user ride request 226. For example, if a user service request 227 includes a request for a vehicle service from a first location to a second location, then the operations computing system 200 can determine a main candidate route from the first location (e.g., to pick-up the user) to the second location (e.g., to drop-off the user). In some implementations, the operations computing system 200 can determine one or more detour candidate routes between the service-start location and the service-end location such that each detour candidate route includes at least one candidate stop from the one or more candidate stops. For example, if a user service request 226 includes a request for a vehicle service from a first location to a second location, and a vendor ride request 227 includes a request for a vehicle service for the transportation of an autonomous robot from a third location to a fourth location, then the operations computing system 200 can determine a detour candidate route from the first location (e.g., to pick-up the user), through the third location (e.g., to pick-up the autonomous robot) and the fourth location (e.g., to drop-off the autonomous robot), and to the second location (e.g., to drop-off the user). Alternatively, the operations computing system 200 can determine the detour candidate route such that an autonomous vehicle 245 is to pick-up the user after the autonomous robot, and/or drop-off the user before the autonomous robot. For example, the operations computing system 200 can determine the detour candidate route from the third location (e.g., to pick-up the autonomous robot), through the first location (e.g., to pick-up the user) and the second location (e.g., to drop-off the user), and to the fourth location (e.g., to drop-off the autonomous robot).

In some implementations, the operations computing system 200 can determine the one or more candidate stops based at least in part on the cabin-space request associated with user service request 225 and the amount of cabin space associated with vendor ride request 227. For example, the operations computing system 200 can determine an available cabin space (e.g., by subtracting the minimum cabin space in the user service request from a total cabin space in the vehicle), and filter the plurality of candidate stops to include candidate stops that are associated with an amount of cabin space that is less than or equal to the available cabin space.

In some implementations, the operations computing system 200 can determine a travel time, available cabin space, and/or service cost associated with each of the plurality of candidate routes. As an example, if a candidate route is associated with the ridesharing with an autonomous robot, then the operations computing system 200 can determine an increase in travel time for the user and/or a decrease in service cost for the user if the candidate route is selected to provide the service for the user. The operations computing system 200 can decrease the service cost by a certain amount for each autonomous robot that rideshares with the user during the service and/or for each unit of cabin space that is occupied by an autonomous robot that rideshares with the user during the service.

In some implementations, the operations computing system 200 can determine one or more service configurations for the service based at least in part on the data indicative of the user service request 225 and the data indicative of the vendor ride request 227. For example, the operations computing system 200 can determine the one or more service configurations, based at least in part on the travel time, available cabin space, and/or service cost associated with each of the plurality of candidate routes. Each of the one or more service configurations can include one or more candidate routes for the service. The one or more service configurations can include, for example, a first service configuration that is associated with a lowest service cost, a second service configuration that is associated with a shortest travel time. The first service configuration can include one or more candidate routes (e.g., from the plurality of candidate routes) that are associated with a lowest service cost. The second service configuration can include one or more candidate routes (e.g., from the plurality of candidate routes) that are associated with a shortest travel time. In some implementations, the operations computing system 200 can determine the one or more service configurations for a plurality of different travel times, available cabin space, and/or service costs associated with the plurality of candidate routes.

At (608), the method 600 can include selecting a service route from the one or more candidate routes. For example, the operations computing system 200 can obtain data indicative of a selected service configuration from the one or more service configurations. The operations computing system 200 can select the service route from the one or more candidate routes associated with the selected service configuration. For example, the operations computing system 200 can communicate data indicative of the one or more service configurations to the user device(s) 220 associated with the user. The user device(s) 220 can be configured to present a user interface (e.g., user interface 424) indicative of the one or more service configurations via a display device (e.g., display device 422). The user device can allow the user to provide input indicative of the selected service configuration (e.g., user interface 424). The user device can provide data indicative of the selected service configuration to the operations computing system 200. The operations computing system 200 can obtain the data indicative of the user input selecting the selected service configuration.

At (610), the method 600 can include determining a service assignment based at least in part on the selected service route. For example, the operations computing system 200 can determine service assignment 230 for an autonomous vehicle 245 based at least in part on the selected service configuration. The service assignment 230 can include data indicating that the autonomous vehicle is to follow the selected service route. For example, the service assignment 230 can indicate that the autonomous vehicle 245 is to transport the user from the service-start location to the service-end location. The service assignment 230 can indicate that the autonomous vehicle 245 is to pick-up the user and pick-up the autonomous robot such that the user. The autonomous robot can ride concurrently onboard the autonomous vehicle 245 during the service.

At (612), the method 600 can include communicating a service assignment to an autonomous vehicle. For example, the operations computing system 200 can communicate data indicative of the service assignment 230 to the autonomous vehicle 245 to perform the service. In particular, the operations computing system 200 can communicate the data indicative of the service assignment 230 to the vehicle computing system(s) 240 associated with the autonomous vehicle 245, via the vehicle interface 235. The vehicle computing system 100 can cause the vehicle 105 to initiate a motion control such that the autonomous vehicle travels to the location(s) indicated in the service assignment. For instance, a motion plan 180 can be provided to the vehicle control system(s) 135 of the autonomous vehicle 105. The vehicle controller can translate a determined motion plan 180 into instructions to steer the vehicle and control its speed to travel in accordance with the service assignment 230. This can allow the autonomous vehicle 105 to autonomously travel to perform the requested services.

Figure 7:
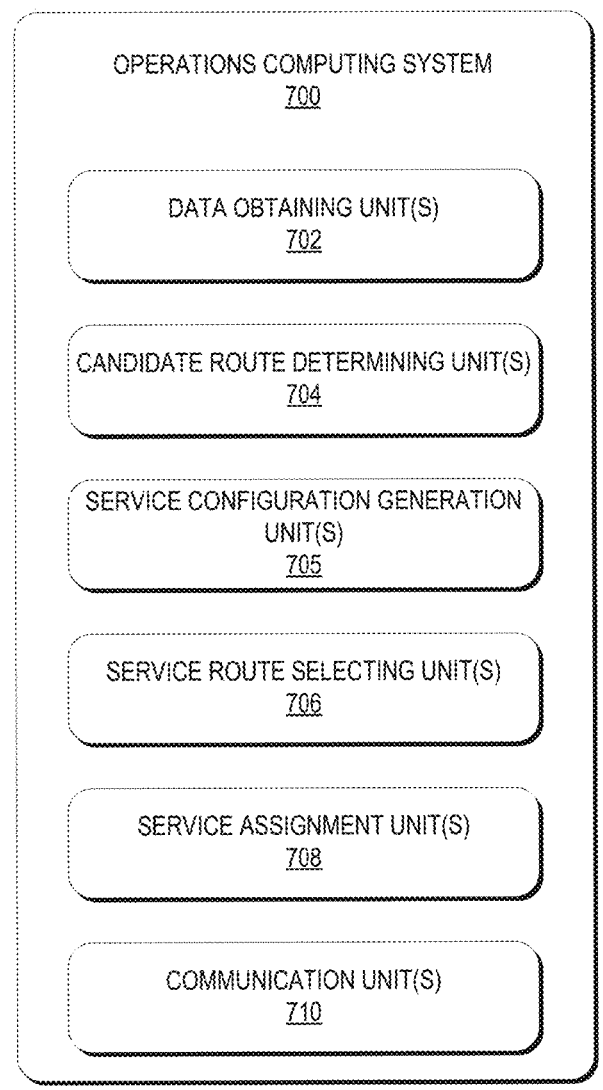
FIG. 7 depicts a diagram of an example computing system that includes various means, according to example embodiments of the present disclosure.

Various means can be configured to perform the methods and processes described herein. For example, FIG. 7 depicts a diagram of an example computing system 700 that includes various means according to example embodiments of the present disclosure. The computing system 700 can be and/or otherwise include, for example, the operations computing system 200, remote computing system 850, etc. The computing system 700 can include data obtaining unit(s) 702, candidate route determining unit(s) 704, service configuration generation unit(s) 705, service route selecting unit(s) 706, service assignment unit(s) 708, communication unit(s) 710, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the data obtaining unit 702) can be configured to obtain one or more user service requests and/or one or more vendor ride requests. As described herein, a user service request can include a request for a vehicle service for a user, and a vendor ride request can include request for a vehicle service for an autonomous robot. The means (e.g., the candidate route determining unit 704) can be configured to determine a plurality of candidate routes for servicing a user service request. The plurality of candidate routes can each correspond to one or more service configurations for servicing the user service request with the autonomous robot. The means (e.g., the service configuration generation unit 705) can be configured to generate one or more service configurations for servicing the user service request. The one or more service configurations can be generated based at least in part on the one or more user ride requests and the one or more vendor ride requests. Each of the one or more service configurations can include one or more candidate routes, and a travel time, available cabin space, and service cost associated with each of the one or more candidate routes. The means (e.g., the service route selecting unit 706) can be configured to select a service route for servicing the user service request. The service route can be selected from the plurality of candidate routes based at least in part on an input from a user. The means (e.g., the service assignment unit 708) can be configured to determine a service assignment for the user service request based at least in part on the selected service route, and to communicate data indicative of the service assignment to an autonomous vehicle from a fleet of vehicles to undertake the service. The means (e.g., communication unit 710) can be configured to communicate data indicative of the service assignment to the vehicle computing system onboard the autonomous vehicle. The vehicle computing system can control the autonomous vehicle based at least in part on the service assignment.

Figure 8:
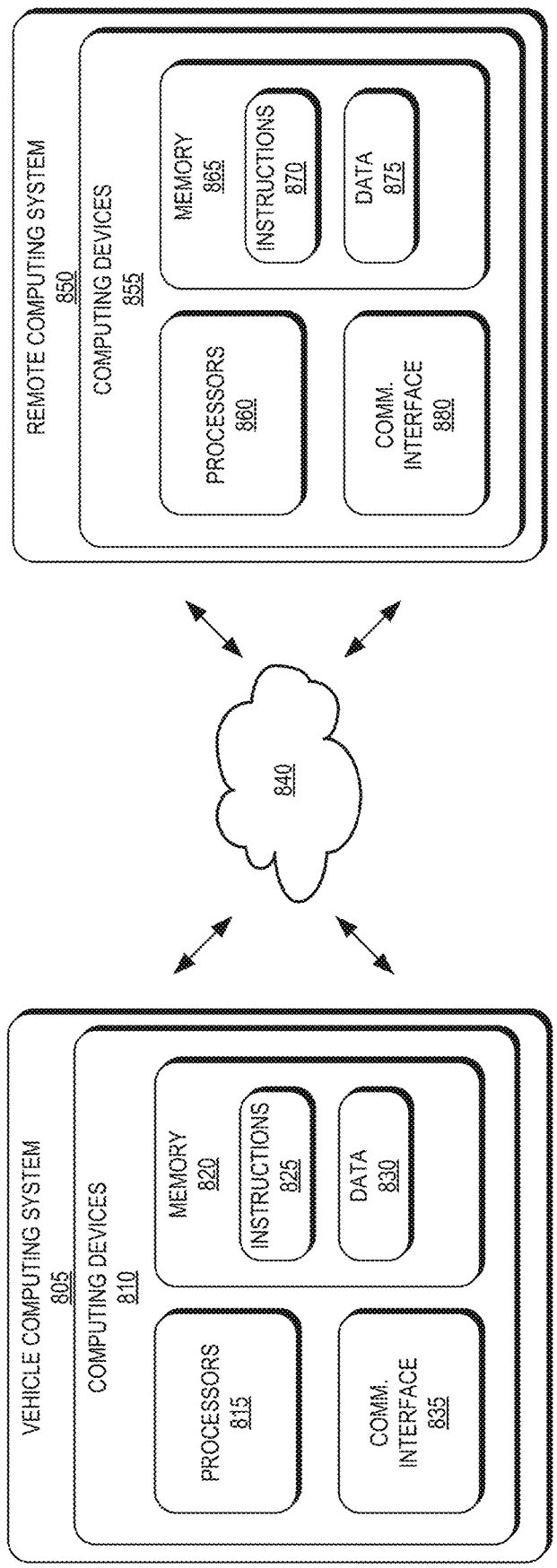
FIG. 8 depicts an example system according to example embodiments of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 of a vehicle. The vehicle computing system 805 can represent/correspond to the vehicle computing systems 100, 240 described herein. The example system 800 can include a remote computing system 850 (e.g., that is remote from the vehicle computing system 805). The remote computing system 850 can represent/correspond to an operations computing system 200 described herein, a vendor computing system 270, user device, and/or vehicle provider computing systems described herein. The vehicle computing system 805 and the remote computing system 850 can be communicatively coupled to one another over one or more network(s) 840.

The computing device(s) 810 of the vehicle computing system 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 815. For instance, the memory 820 (e.g., one or more non-transitory computer-readable storage mediums, memory devices) on-board the vehicle can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 can store instructions 825 that when executed by the one or more processors 815 cause the one or more processors 815 (the vehicle computing system 805) to perform operations such as any of the operations and functions of the vehicle computing system 100 (or for which it is configured), one or more of the operations and functions of the vehicle provider computing systems and/or vendor computing systems (or for which they are configured), one or more of the operations and functions of the operations computing systems 200 described herein (or for which it is configured), one or more portions of method 600, and/or one or more of the other operations and functions of the computing systems described herein.

The memory 820 can store data 830 that can be obtained (e.g., acquired, received, retrieved, accessed, created, stored, etc.). The data 830 can include, for instance, sensor data, map data, vehicle state data, perception data, prediction data, motion planning data, data associated with a vehicle client, data associated with service assignments, data associated with routes (e.g., candidate, main, detour, selected, etc. routes), data associated with service configurations, data associated with locations, data associated with user interfaces, data associated with user input, and/or other data/information such as, for example, that described herein. In some implementations, the computing device(s) 810 can obtain data from one or more memories that are remote from the vehicle computing system 805.

The computing device(s) 810 can also include a communication interface 835 used to communicate with one or more other system(s) on-board a vehicle and/or a remote computing device that is remote from the vehicle (e.g., of the system 850). The communication interface 835 can include any circuits, components, software, etc. for communicating via one or more networks (e.g., network(s) 840). The communication interface 835 can include, for example, one or more of a communications controller, receiver, transceiver, transmitter, port, conductors, software and/or hardware for communicating data.

The remote computing system 850 can include one or more computing device(s) 855 that are remote from the vehicle computing system 805. The computing device(s) 855 can include one or more processors 860 and a memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registrar, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860.

For example, the memory 865 can store instructions 870 that when executed by the one or more processors 860 cause the one or more processors 860 to perform operations such as any of the operations and functions of the operations computing systems 200 described herein, any operations and functions of the vehicle provider computing systems and/or vendor computing systems, any of the operations and functions for which the operations computing systems 200 and/or the vehicle computing systems 100 are configured, one or more of the operations and functions of the vehicle computing system 100 described herein, one or more of the operations and functions for providing an autonomous vehicle service, one or more portions of method 600, and/or one or more of the other operations and functions described herein.

The memory 865 can store data 875 that can be obtained. The data 875 can include, for instance, data associated with service requests, communications associated with/provided by vehicles, data to be communicated to vehicles, application programming interface data, data associated with vehicles and/or vehicle parameters, data associated with locations, data associated with user interfaces, data associated with user input, data associated with service assignments, data associated with different service entities, data associated with fleet(s) of vehicles, data associated with routes, data associated with service configurations, and/or other data/information such as, for example, that described herein.

The computing device(s) 855 can also include a communication interface 880 used to communicate with one or more system(s) onboard a vehicle and/or another computing device that is remote from the system 850. The communication interface 880 can include any circuits, components, software, etc. for communicating via one or more networks (e.g., network(s) 840). The communication interface 880 can include, for example, one or more of a communications controller, receiver, transceiver, transmitter, port, conductors, software and/or hardware for communicating data.

The network(s) 840 can be any type of network or combination of networks that allows for communication between devices. In some embodiments, the network(s) 840 can include one or more of a local area network, wide area network, the Internet, secure network, cellular network, mesh network, peer-to-peer communication link and/or some combination thereof and can include any number of wired or wireless links. Communication over the network(s) 840 can be accomplished, for instance, via a communication interface using any type of protocol, protection scheme, encoding, format, packaging, etc.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An autonomous vehicle control system for an autonomous vehicle, the autonomous vehicle control system comprising:
   one or more processors; and
   one or more tangible, non-transitory, computer readable media that store instructions for execution by the one or more processors to cause the autonomous vehicle control system to perform operations comprising:
   obtaining data indicative of a user service request, the user service request comprising a service-start location and a service-end location for a service associated with a user;

obtaining data indicative of a vendor ride request for transportation of goods, wherein the vendor ride request comprises an amount of cabin space associated with the goods;

obtaining data indicative of a selected service assignment, wherein the selected service assignment is determined based on data indicative of a selected service configuration from one or more service configurations, wherein the selected service configuration is determined based on the data indicative of the user service request and the data indicative of the vendor ride request, wherein the selected service assignment indicates that the autonomous vehicle is to transport the user from the service-start location to the service-end location; and initiating a motion control of the autonomous vehicle to travel in accordance with a service route associated with the selected service assignment.

2. The autonomous vehicle control system of claim 1, wherein the selected service configuration comprises a travel time, an available cabin space, or a service cost associated with the service.

3. The autonomous vehicle control system of claim 2, the operations further comprising:

obtaining data indicative of the one or more service configurations comprising the selected service configuration, wherein the one or more service configurations respectively comprise at least one of: (i) a travel time, (ii) an available cabin space, or (iii) a service cost associated with the service.

4. The autonomous vehicle control system of claim 1, wherein the goods comprise a robot.

5. The autonomous vehicle control system of claim 4, wherein the selected service assignment indicates that the autonomous vehicle is to pick up the user and pick up the robot, and wherein the user and the robot ride concurrently onboard the autonomous vehicle during the service.

6. The autonomous vehicle control system of claim 1, wherein the vendor ride request comprises a ride-start location and a ride-end location.

7. A method comprising:

obtaining data indicative of a user service request, the user service request comprising a service-start location and a service-end location for a service associated with a user;

obtaining data indicative of a vendor ride request for transportation of goods, wherein the vendor ride request comprises an amount of cabin space associated with the goods;

obtaining data indicative of a selected service assignment, wherein the selected service assignment is determined based on data indicative of a selected service configuration from one or more service configurations, wherein the selected service configuration is determined based on the data indicative of the user service request and the data indicative of the vendor ride request, wherein the selected service assignment indicates that an autonomous vehicle is to transport the user from the service-start location to the service-end location; and initiating a motion control of the autonomous vehicle to travel in accordance with a service route associated with the selected service assignment.

8. The method of claim 7, wherein the selected service configuration comprises a travel time, an available cabin space, or a service cost associated with the service.

9. The method of claim 7, further comprising:

determining one or more candidate stops based at least in part on a cabin-space request associated with the user service request and the amount of cabin space associated with the goods.

10. The method of claim 9, further comprising:

determining available cabin space based on the cabin-space request associated with the user service request; and filtering the one or more candidate stops to include candidate stops associated with an amount of cabin space that is less than or equal to the available cabin space.

11. The method of claim 10, wherein the goods comprise a robot.

12. The method of claim 11, wherein the user service request comprises a cabin-space request for the service and the vendor ride request comprises an amount of cabin space associated with the robot, and wherein the one or more candidate stops are determined based at least in part on the cabin-space request and the amount of cabin space associated with the vendor ride request.

13. The method of claim 11, wherein the user and the robot ride concurrently onboard the autonomous vehicle during the service.

14. The method of claim 13, wherein the selected service assignment indicates that the autonomous vehicle is to drop off the user before the autonomous vehicle is to drop off the robot.

15. The method of claim 7, further comprising:

determining one or more candidate routes between the service-start location and the service-end location for the autonomous vehicle based at least in part on the vendor ride request.

16. The method of claim 15, wherein the vendor ride request comprises a ride-start location and a ride-end location, wherein determining the one or more candidate routes comprises:

determining a main candidate route between the service-start location and the service-end location indicated by the user service request;

determining one or more candidate stops proximate to the main candidate route based at least in part on the ride-start location and the ride-end location indicated by the vendor ride request; and determining one or more detour candidate routes between the service-start location and the service-end location, each detour candidate route comprising at least one candidate stop from the one or more candidate stops.

17. An autonomous vehicle; comprising:

one or more processors; and one or more non-transitory computer-readable media that store instructions for execution by the one or more processors to cause the one or more processors to perform operations, the operations comprising:

obtaining data indicative of a user service request, the user service request comprising a service-start location and a service-end location for a service associated with a user;

obtaining data indicative of a vendor ride request for transportation of goods, wherein the vendor ride request comprises an amount of cabin space associated with the goods;

obtaining data indicative of a selected service assignment, wherein the selected service assignment is determined based on data indicative of a selected service configuration from one or more service configurations, wherein the selected service configuration is determined based on the data indicative of the user service request and the data indicative of the vendor ride request, wherein the selected service assignment indicates that the autonomous vehicle is to transport the user from the service-start location to the service-end location; and initiating a motion control of the autonomous vehicle to travel in accordance with a service route associated with the selected service assignment.

18. The autonomous vehicle of claim 17, further comprising a cabin comprising units of cabin space.

19. The autonomous vehicle of claim 17, wherein the autonomous vehicle is vehicle selected from a fleet of vehicles associated with a vehicle provider.

\* \* \* \* \*